(12) United States Patent
Evangelista et al.

(10) Patent No.: US 7,891,479 B2
(45) Date of Patent: Feb. 22, 2011

(54) MODULAR CONVEYOR SYSTEM

(76) Inventors: Carl Evangelista, 46850 Grand River Ave., Novi, MI (US) 48374; Michael Evangelista, 46850 Grand River Ave., Novi, MI (US) 48374; Kimberly K. Kelm, 46850 Grand River Ave., Novi, MI (US) 48374; Dennis K. Scheer, 46850 Grand River Ave., Novi, MI (US) 48374

( * ) Notice: Subject to any disclaimer, the term of this patent is extended or adjusted under 35 U.S.C. 154(b) by 142 days.

(21) Appl. No.: 12/218,651

(22) Filed: Jul. 16, 2008

(65) Prior Publication Data

US 2009/0065327 A1 Mar. 12, 2009

Related U.S. Application Data

(60) Provisional application No. 60/967,911, filed on Sep. 7, 2007.

(51) Int. Cl.
*B65G 41/00* (2006.01)

(52) U.S. Cl. .................. 198/312; 198/313; 198/588

(58) Field of Classification Search .............. 198/300, 198/312, 313, 588, 812
See application file for complete search history.

(56) References Cited

U.S. PATENT DOCUMENTS

| | | | | |
|---|---|---|---|---|
| 2,479,823 A * | 8/1949 | Ernst | .................. | 198/312 |
| 3,826,353 A * | 7/1974 | Greasley | ................ | 198/313 |
| 3,866,889 A | 2/1975 | Maxon, III | ............... | 259/161 |
| 4,343,389 A | 8/1982 | Ponstein | .................. | 198/316 |
| 4,432,676 A | 2/1984 | Jacobson et al. | ............... | 406/39 |
| 4,552,489 A | 11/1985 | Jacobson et al. | ............... | 406/39 |
| 4,556,112 A | 12/1985 | Theurer et al. | ................ | 171/16 |
| 4,951,801 A | 8/1990 | Mraz | ...................... | 198/303 |
| 5,044,867 A | 9/1991 | Petijohn | .................. | 414/523 |
| 5,163,545 A | 11/1992 | David | ...................... | 198/588 |
| 5,190,134 A | 3/1993 | Mraz | ...................... | 198/303 |
| 5,249,823 A | 10/1993 | McCoy et al. | ................ | 280/656 |
| 5,307,917 A * | 5/1994 | Hall | ........................ | 198/313 |
| 5,360,097 A | 11/1994 | Hibbs | ...................... | 198/313 |
| 5,402,874 A | 4/1995 | Dahlin et al. | ............... | 198/300 |
| 5,443,351 A | 8/1995 | Pettijohn | .................. | 414/523 |
| 5,669,712 A | 9/1997 | Bauermeister et al. | ...... | 366/348 |
| 6,230,740 B1 | 5/2001 | Horton et al. | ............... | 137/614 |
| 6,283,697 B1 * | 9/2001 | Pierce et al. | ............... | 198/588 |

(Continued)

FOREIGN PATENT DOCUMENTS

DE 100 39 545 A1 8/2000

(Continued)

OTHER PUBLICATIONS

Written Opinion; Dated for Nov. 6, 2008.

*Primary Examiner*—James R Bidwell
(74) *Attorney, Agent, or Firm*—L.C. Begin & Associates, PLLC.

(57) ABSTRACT

A mobile conveyor system includes a conveyor having a portion with a first dimension, the first dimension having a value falling within a predetermined range of values. The system also includes a mobile frame assembly for mounting the conveyor thereon. The frame assembly defines a conveyor mounting bed having a second dimension that is adjustable for receiving therein the portion of the conveyor having the first dimension, for mounting the conveyor to the frame assembly.

13 Claims, 12 Drawing Sheets

U.S. PATENT DOCUMENTS

| | | |
|---|---|---|
| 6,312,212 B1 | 11/2001 | Burlew, Jr. .................. 414/723 |
| 6,422,374 B1 | 7/2002 | West ......................... 198/303 |
| 6,471,031 B1 | 10/2002 | Duncalf ...................... 198/311 |
| 6,516,917 B1 | 2/2003 | Mayer et al. ................. 182/17 |
| 6,688,450 B2 | 2/2004 | Speers et al. ................ 198/312 |
| 7,131,704 B2 | 11/2006 | Murray et al. ............... 299/39.2 |
| 7,438,173 B1 * | 10/2008 | Schoonover et al. ........ 198/312 |
| 2003/0010600 A1 | 1/2003 | Speers et al. ................ 198/300 |
| 2006/0102363 A1 | 5/2006 | Tvetene et al. ............... 172/20 |
| 2006/0245891 A1 | 11/2006 | Flaherty ..................... 414/607 |

FOREIGN PATENT DOCUMENTS

| | | |
|---|---|---|
| DE | 101 56 074 A1 | 11/2001 |
| DE | 10 2005 023 922 A1 | 5/2005 |
| EP | 0 038 491 | 4/1981 |
| EP | 0 424 591 A1 | 10/1989 |
| EP | 1 068 096 B1 | 3/1999 |
| EP | 1 080 635 B1 | 5/2000 |
| EP | 1 216 804 B1 | 12/2001 |
| JP | 10226412 A2 | 8/1998 |
| JP | 11147607 A | 2/1999 |
| JP | 2002095991 A | 2/2002 |
| JP | 2003145058 A | 2/2003 |
| WO | WO 88/02730 | 4/1988 |
| WO | WO 99/61317 | 12/1999 |
| WO | WO 2004/096677 A1 | 11/2004 |

\* cited by examiner

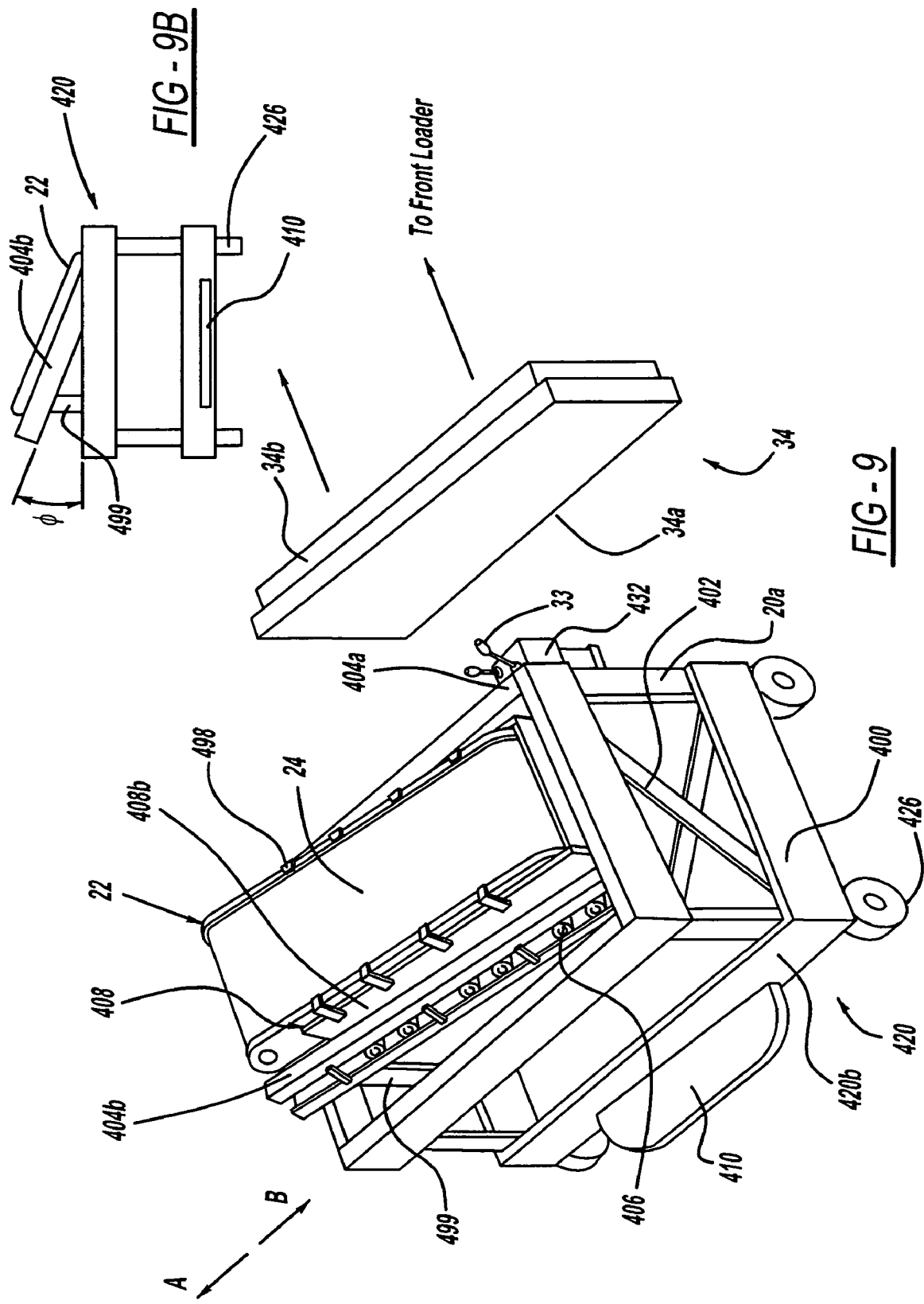

MODULAR CONVEYOR SYSTEM

CROSS-REFERENCE TO RELATED APPLICATIONS

The present application claims the benefit of U.S. Provisional Application Ser. No. 60/967,911 having a filing date of Sep. 7, 2007.

BACKGROUND OF THE INVENTION

The embodiments of the present invention disclosed herein relate to conveyor systems for transporting bulk material.

SUMMARY OF THE INVENTION

In one aspect of the present invention, a mobile frame assembly is provided for mounting a conveyor thereon. The frame assembly includes a skeleton and a carriage assembly movably coupled to the skeleton for mounting the conveyor thereon. The carriage assembly is movable in a first direction and a second direction with respect to the skeleton, the second direction being substantially opposite the first direction.

In another aspect of the present invention, a mobile frame assembly is provided for mounting thereon a conveyor having a first dimension. The frame assembly defines a conveyor mounting bed having a second dimension that is adjustable for receiving therein the first dimension, for securing the conveyor to the frame assembly.

In yet another aspect of the present invention, a mobile conveyor system is provided which includes a conveyor having a portion with a first dimension, the first dimension having a value falling within a predetermined range of values. A mobile frame assembly is also provided for mounting the conveyor thereon, the frame assembly defining a conveyor mounting bed having a second dimension that is adjustable for receiving therein the portion of the conveyor having the first dimension, for mounting the conveyor to the frame assembly.

In yet another aspect of the present invention, a mobile frame assembly is provided for mounting a conveyor thereon. The frame assembly defines a conveyor mounting bed adjustable for securing thereon a portion of the conveyor to mount the conveyor to the frame assembly. The portion of the conveyor has a first dimension, the first dimension having a value falling within a predetermined range of values.

In yet another aspect of the present invention, a mobile frame assembly is provided for mounting a conveyor thereon. The frame defines a conveyor mounting bed movable along an axis for varying a position of a conveyor secured to the mounting bed.

BRIEF DESCRIPTION OF THE DRAWINGS

In the drawings illustrating embodiments of the present invention:

FIGS. 5A-8 show various embodiments of clamping mechanisms for securing a conveyor to a mobile frame accordance with an embodiment of the invention.

FIG. 9 is perspective view of a mobile conveyor system in accordance with a second embodiment of the invention.

FIG. 9B is an end view of the embodiment shown in FIG. 9.

DETAILED DESCRIPTION

Figure 1:
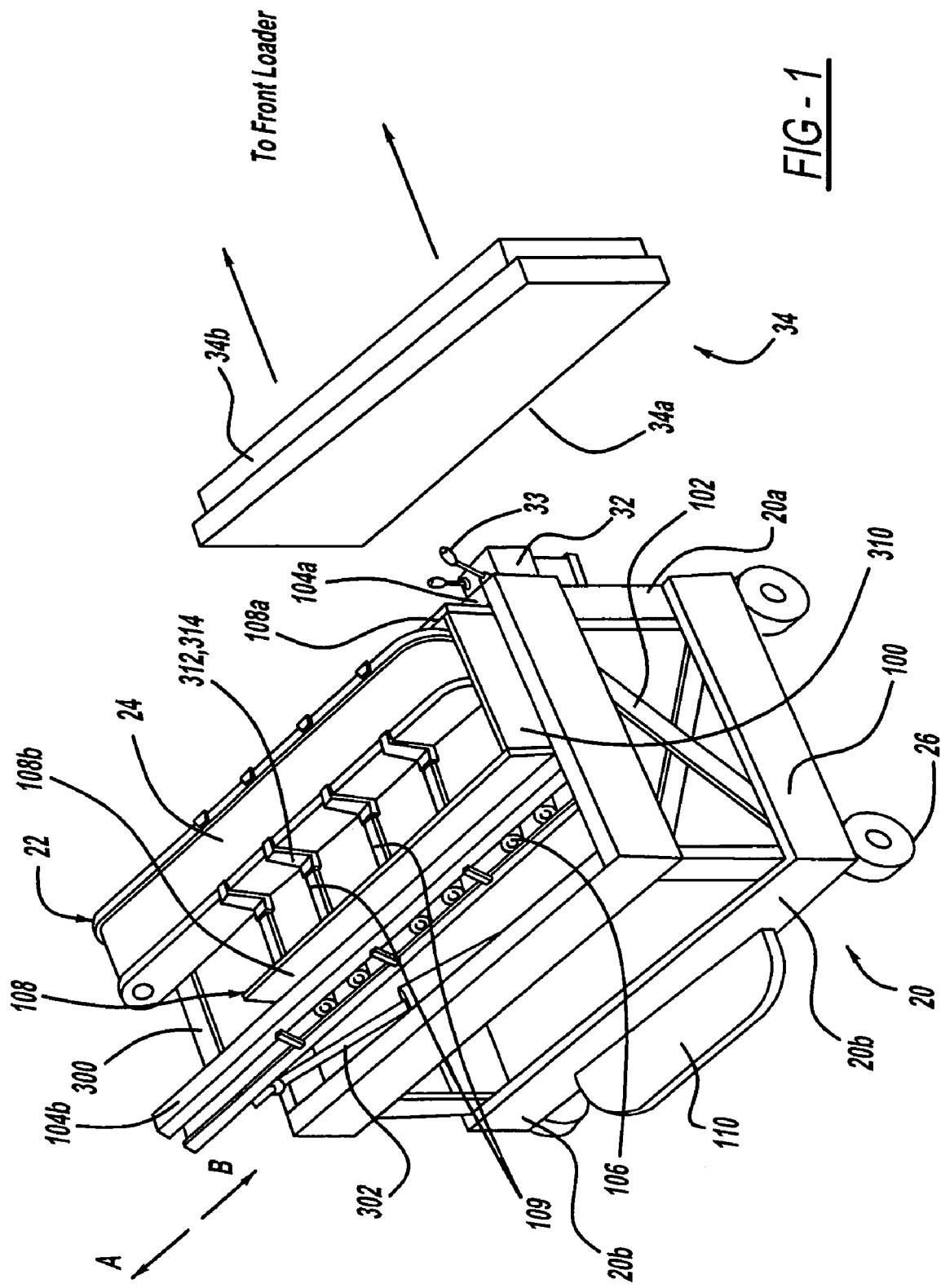
FIG. 1 is perspective view of a mobile conveyor system in accordance with a first embodiment of the invention.
Figure 1A:
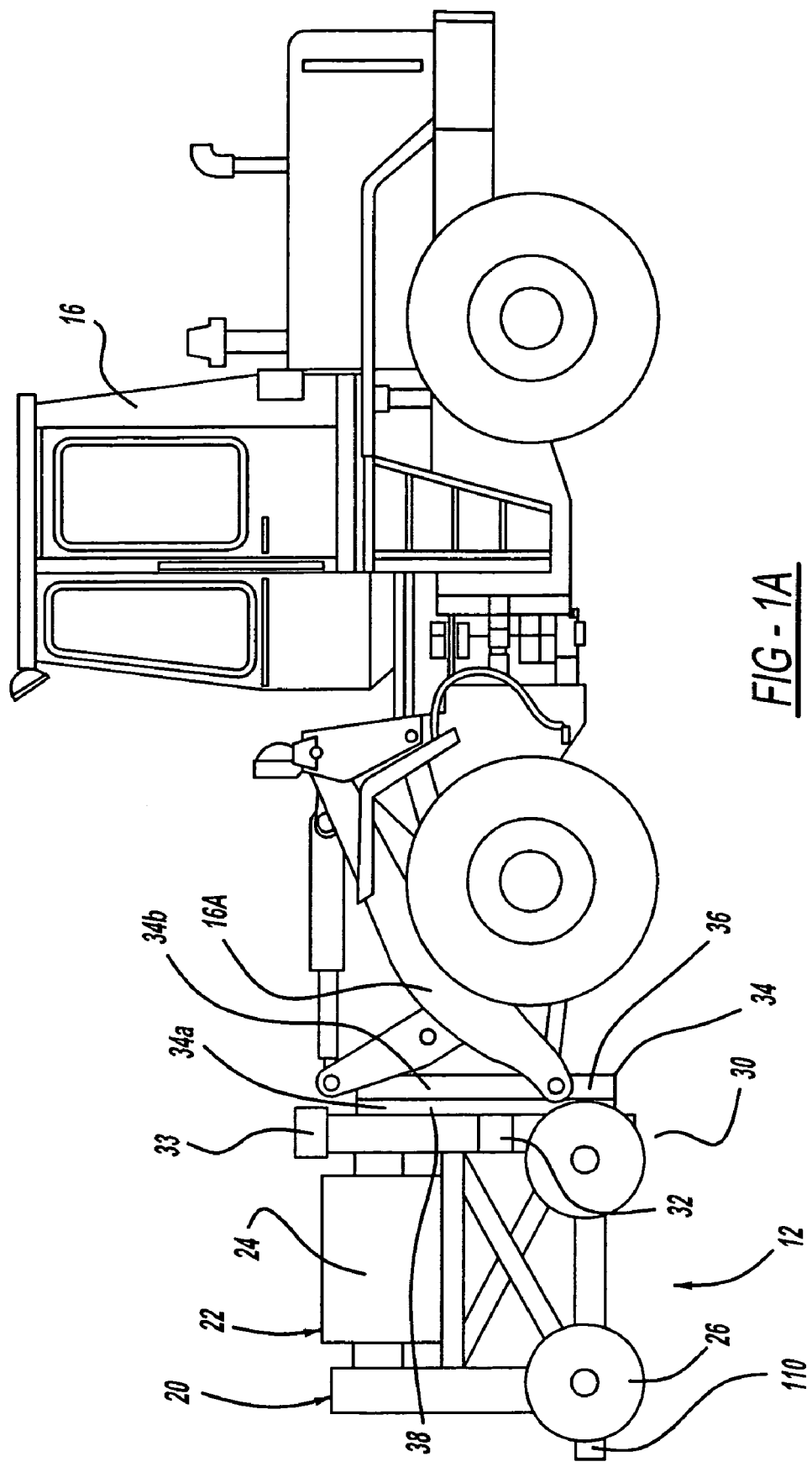
FIG. 1A is a schematic side view of a mobile conveyor system in accordance with an embodiment of the invention coupled to a front loader for transport.

FIG. 1A shows a schematic representation of a modular, mobile conveyor system 12 in accordance with an embodiment of the present invention coupled to a front loader 16. Front loader 16 may be wheeled or tracked, depending on a particular application. Loader 16 may be a known loader manufactured by any of a variety of vendors (for example, Caterpillar Inc. or Volvo Construction Equipment). One example of a front loader suitable for the application described herein is a model L90F manufactured by Volvo Construction Equipment.

As is known in the art, a permanent or removable attachment (for example, a bucket, dozer blade, or grappling mechanism, not shown) may be coupled to the front of loader 16 to facilitate the lifting and transport of various types of materials. The loader generally incorporates a series of linkages, hydraulic cylinders, associated controls and other elements which enable the vehicle to perform (via the attachment) lifting, transport, or movement of a wide variety of materials such as concrete mix, soil, gravel, straw bales, and the like. In the embodiments of the present invention, a mobile frame assembly 20 (described below) on which a conveyor is mounted is coupled to the loader in place of the conventional attachment described above. Alternatively, the mobile conveyor system may be coupled to any other type of suitable transport vehicle for movement.

Loader 16 has a known connection interface (generally designated 16A) incorporated thereon, by which a desired attachment is mounted and secured to the loader in a known manner. In general, the design of connection interface 16A varies with the loader manufacturer. As seen in FIG. 1A, in accordance with the embodiments of the invention described herein, mobile modular conveyor system 12 is coupled to an end of loader 16. Conveyor system 12 includes a frame assembly 20 and a transfer conveyor 22 mounted to the frame.

Referring to FIGS. 1 and 1A, an adapter or coupling system, generally designated 34, is provided to facilitate coupling of frame assembly 20 to loader 16. Adapter 34 has a first portion 34a configured for engagement with frame assembly 20, and a second portion 34b configured for engagement with a predetermined make and model of front loader to be used to transport and operate the conveyor.

First adapter portion 34a includes any of a variety of desired known features which enable the adapter to be coupled to the frame assembly 20 and which will secure the frame assembly to the adapter during movement and manipulation of the frame assembly by the front loader. Examples of possible methods of connecting frame assembly 20 to adapter 34 include welding, bolts, and/or the provision of mounting ears on the adapter and the provision of associated openings on the frame assembly for complementary engagement with the adapter mounting ears. Other attachment methods are also contemplated. The second portion 34b of the adapter includes features designed to mate with complementary mounting features found on the particular front loader being used. This enables the adapter first portion 34a to be of standardized construction, while the second adapter portion 34b is customized to mate with the mounting features on a particular loader. The first and second portions of the adapter can thus be fabricated and stored separately, then joined together at a later point in time (by welding, for example) when the particular model of front loader is selected. Alternatively, adapter first portion 34a and second portion 34b can be fabricated and stored as a single piece.

In one known application of the mobile conveyor system, the conveyor is used as a spreader to spread any of a variety of paving materials including, but not limited to, sand, asphalt and concrete across a roadbed or other area to be paved. When concrete is used as the paving material, the conveyor/spreader receives the concrete directly from a delivery truck which transports the concrete to the paving site. The paving material is then transported to a second end of the conveyor, where it is propelled off the end of the conveyor and spreads across the roadbed or other area to be paved, as the conveyor slowly travels in a direction of paving. Following behind the spreader is a paver which vibrates, extrudes, consolidates and otherwise finishes the concrete which has been spread out across the roadbed by the spreader. Numerous other applications of such a conveyor system are known in the art. In another embodiment, the conveyor is closed or covered. In another possible application of the system, the loader and its attached frame and conveyor are positioned in a ditch or other depression and are used to lift material removed from the depression up to ground level.

Figure 5:
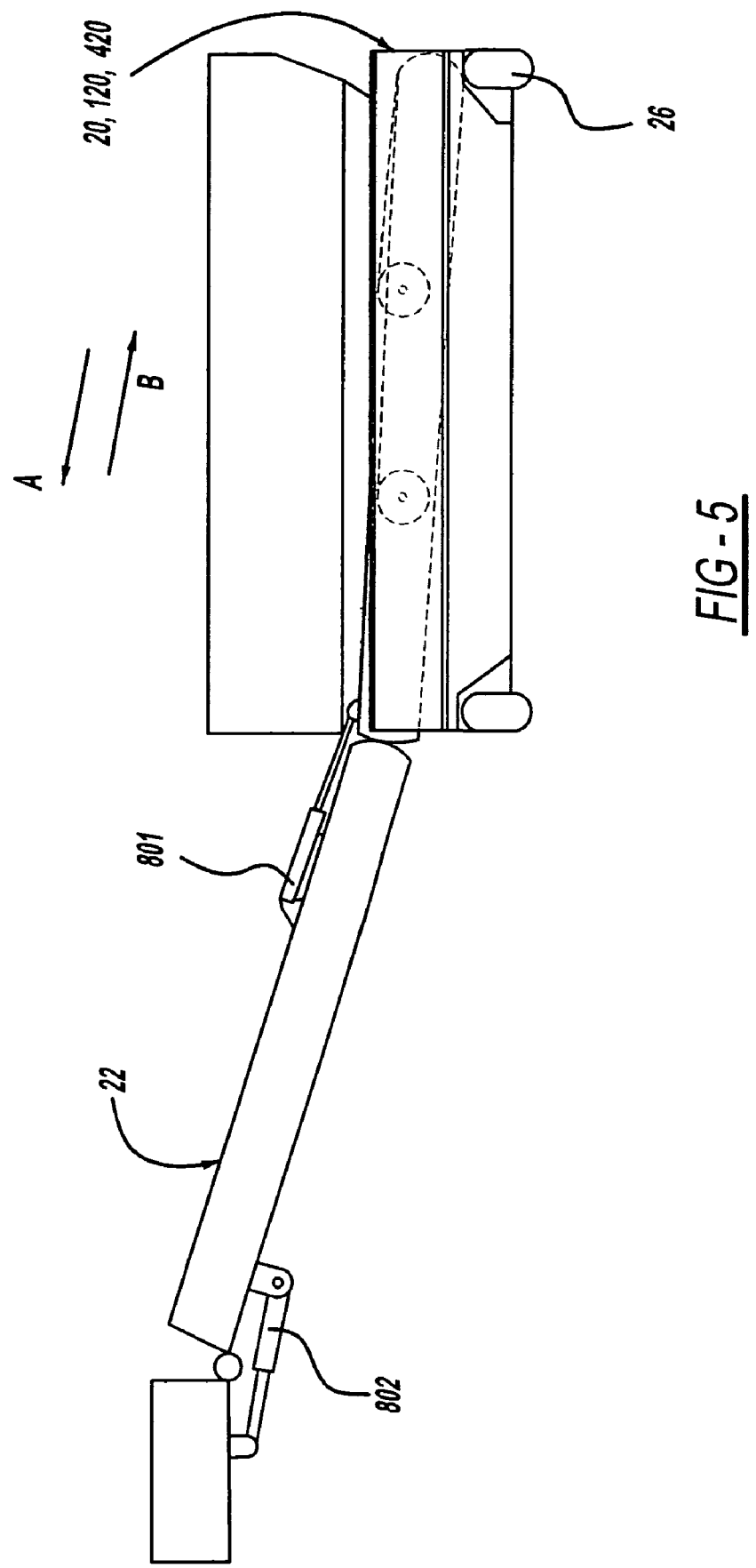
FIG. 5 is a side view of an embodiment of the conveyor incorporated into the mobile conveyor system.

Conveyor 22 may be any conveyor that is mountable on frame 20, which defines an adjustable size envelope into which the conveyor fits. Conveyor 22 may be a stock or custom-designed conveyor including one or more roller-mounted or drum-mounted conveyor belts 24 for transferring material (such belts being usable, for example, in receiving paving material from a delivery truck and delivering the paving material to a prepared roadbed), a motor (not shown) for powering the conveyor, and a known drive or power transmission system coupling the motor to the conveyor rollers or drums, for transmitting power from the motor to the conveyor belts. Other types of conveyors (for example, screw conveyors) may also be used, if mountable on the frame assembly. In one embodiment, shown FIG. 5, conveyor 22 is articulated and hydraulically foldable using cylinders 801 and 802, to conserve space and for ease of transport. Conveyor 22 may be bolted, clamped, welded, or otherwise suitably attached to frame assembly 20 in a manner described herein or in another manner known in the art. Examples of manufacturers of conveyors and associated drive mechanisms suitable for use in the conveyor system described herein are Conveyall Industrial Supply, Inc. of Wixom, Mich. and Cisco-Eagle of Dallas, Tex.

The conveyor drive system may be a constant-speed or an adjustable-speed drive system. The drive system of conveyor 22 may be powered by one or more hydraulic lines connected to the front loader, or the conveyor may be mounted onto frame 20 and a frame-mounted or non frame-mounted power source coupled to the conveyor. For example, a stand-alone or frame-mounted diesel or gasoline power unit may be coupled to the conveyor for operation thereof.

Figure 2:
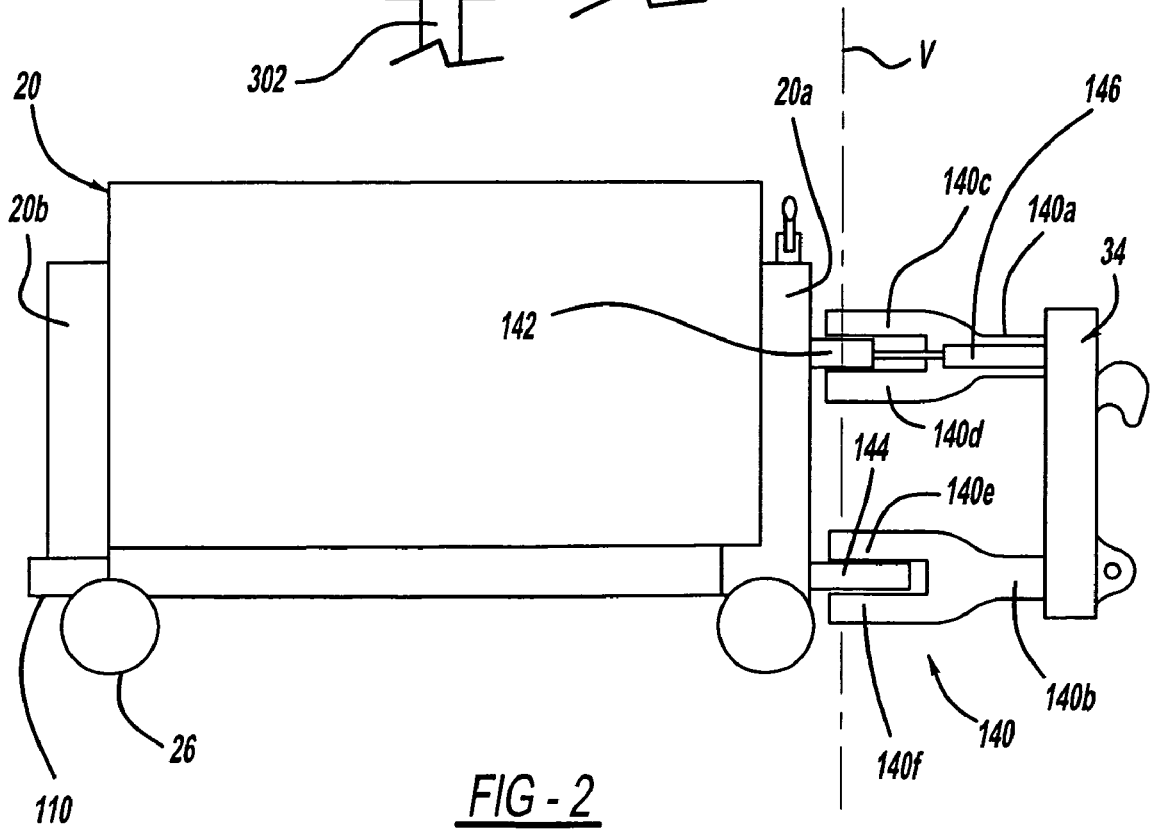
FIG. 2 is a side view of a portion of an embodiment of the present invention showing a swivel system for coupling the mobile conveyor system to a front loader.

Referring to FIGS. 1 and 2, a mobile frame assembly, generally designated 20, is coupled to front loader 16 using adapter 34, as previously described. Frame assembly 20 is configured for mounting conveyor 22 thereon, thus enabling the conveyor to be transported to, and used at, any worksite accessible by the transport vehicle. During use of the conveyor, the conveyor remains mounted to the frame assembly and the frame assembly remains coupled to the front loader.

In addition, as explained below, a motor (not shown), a drive system, and a hydraulic system mounted in the frame assembly enable the position and/or orientation of the conveyor to be adjusted, to facilitate use of the conveyor for transport of bulk materials from one location to another. Several of the embodiments of frame assembly 20 described herein are designed to permit mounting and securement thereon of any one of numerous portable conveyors having a variety of widths. That is, portions of the frame assembly are adjustable to permit mounting and securement of any portable conveyor having a width dimension falling within a predetermined range.

Referring to FIG. 1, in a first embodiment, the frame assembly 20 comprises a skeleton 100 formed from steel members (for example, channels, I-beams, or tubing) welded or otherwise suitably connected to provide a rigid structure for supporting the weight of the conveyor, a carriage assembly 108 (described below), one or more hydraulic motors (not shown), associated hydraulic fluid lines, valves, controls, and any other desired devices or elements.

Interior bracing or cross-members, generally designated 102, interconnect the steel members forming skeleton 100 to provide additional load bearing capability and rigidity. Cross-members 102 may also define one or more equipment beds or cages (not shown) for receiving a hydraulic motor and other frame-mounted elements therein. Cross-members 102 also provide additional structural members for securing hydraulic fluid lines thereto as needed. Cross-members 102 may be formed from steel tubing, angle sections, channel sections, cabling, or other suitable structural elements or materials. Cross-members 102 may be connected to each other and to skeleton 100 by welding, fasteners, or other suitable methods.

Frame assembly 20 may be designed using known techniques to minimize the weight of the skeleton, cross members and other equipment incorporated into the frame assembly, thereby correspondingly minimizing the total weight of the frame assembly. The frame assembly may also be constructed such that any equipment beds or cages, cross-members, and any other associated equipment are positioned as close as possible to adapter 34 when the frame assembly is mounted to the front loader. This reduces the force moments acting both on the loader and on the mounting connections between the vehicle and frame assembly 20.

Referring again to FIG. 1, frame assembly 20 may include one or more wheels 26 mounted thereon to enable the frame assembly to be rolled ahead of the front loader after attachment thereto. In one embodiment, wheels 26 are mounted so as to be retractable or to otherwise permit positioning and securement of the wheels above a road line. This permits the frame assembly to be rolled to a location and rested directly on the road surface or another surface. In a particular embodiment, wheels 26 are mounted in a manner similar to casters, enabling the wheels to turn 360° to accommodate motion of the frame assembly in any direction. Any of a variety of known wheel or roller types capable of supporting the loads experienced during movement and operation of the modular conveyor system may be used. One or more locking mechanisms (not shown) may be provided for each wheel to prevent undesired re-direction and/or rotation of the wheel when the frame assembly has been positioned in a desired location.

Referring again to FIG. 1, a "truck pusher" or bumper 110 may also be attached to frame assembly 20 for absorbing an impact of a vehicle on the frame assembly and/or to prevent damage to the frame assembly in the event of a collision between the frame assembly and a stationary object. Bumper 110 may be any commercially available bumper assembly suitable for the purposes described. Alternatively, the bumper may be a simple steel member suitably attached to an outer edge of the frame assembly, as shown in FIG. 1.

If desired, bumper 110 may be permanently attached to frame assembly 20, for example, by welding. In the embodiment shown in FIG. 1, holes (not shown) are formed in opposite sides 20a, 20b of the frame assembly for receiving bolts therein, and bumper 110 is bolted or otherwise removably secured to the frame assembly. This enables the bumper to be mounted to either of sides 20a, 20b as needed.

Hydraulic lines (not shown) extend from one or more hydraulic system pumps powered by the vehicle engine, to any frame-mounted hydraulically-actuated cylinders and other control elements. The hydraulic lines are connected to the conveyor system control elements by hydraulic couplings in a manner well-known in the art.

A centralized bank of hydraulic couplings 32 may be mounted on frame assembly 20 to facilitate coupling between the hydraulic lines and any hydraulic components mounted on the frame assembly. Hydraulic lines extending between couplings 32 and the frame-mounted hydraulic components may be secured to elements of the frame assembly using cable ties or other known means. In addition, a set of known hydraulic controls 33 coupled to coupling bank 32 may be provided for a user positioned adjacent the frame during operation of the conveyor. Alternatively (or in addition to) the external set of controls, a cab-mounted set of controls (not shown) may be provided inside the vehicle control cab, to enable control of the conveyor from inside the vehicle.

Figure 1B:
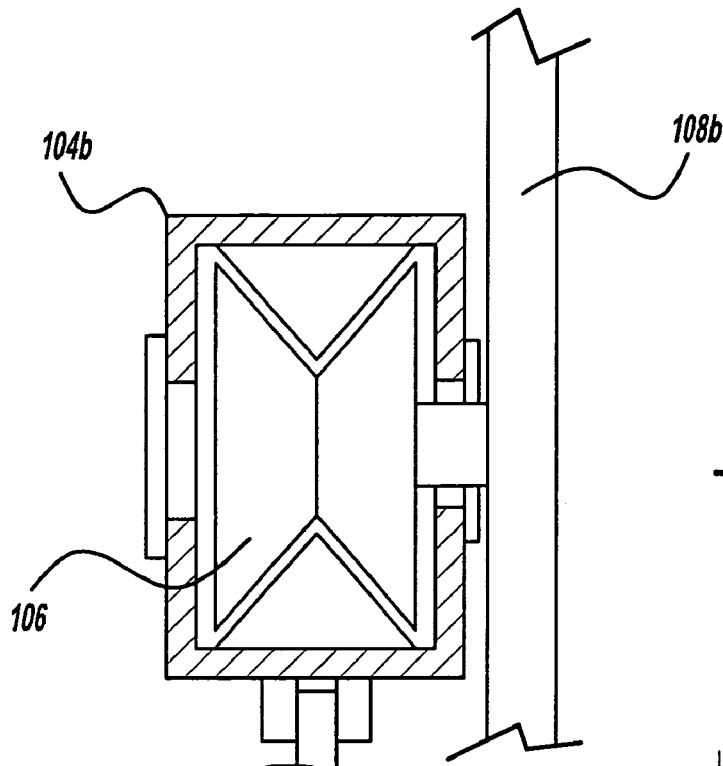
FIG. 1B is a cross-sectional end view of a wheel mounted in a wheel guide in accordance with an embodiment of the present invention.

Referring again to FIGS. 1, and 1B, wheel guides 104a and 104b are rotatably connected to respective sides 20a and 20b of frame assembly 20. Ends of wheel guides 104a, 104b are connected to frame assembly 20 using a hinge arrangement or other means designed to enable rotation of the wheel guides with respect to the frame assembly. Each of wheel guides 104a, 104b may be formed from one or more steel angles, beams, channels, or other appropriately-shaped members configured to provide tracks or rails for wheels 106 mounted on a carriage assembly 108, as described in greater detail below. Tracks or rails may be used which have cross-sectional shapes that are complementary with any of a variety of known wheel or roller types. If desired, as shown in FIG. 1B, wheel guides 104a, 104b may be configured to form enclosures in which wheels roll along the wheel guide in the directions indicated by arrows A and B (FIG. 1). Such enclosures aid in preventing wheels 106 from "jumping" out of the wheel guides in the event of an impact force or other undesirable force acting on the conveyor or frame assembly.

Referring again to FIG. 1, as stated previously, end portions of wheel guides 104a, 104b are hinged or otherwise rotatably coupled to frame assembly 20. Opposite end portions of wheel guides 104a, 104b are attached to a conveyor support 300 using welding or other suitable means. A first hydraulic cylinder 302 is hinged or otherwise rotatably coupled at a first end thereof to a first end of conveyor support 300, and a second hydraulic cylinder 304 (not shown in FIG. 1) is hinged or otherwise rotatably coupled at a first end thereof to a second end of conveyor support 300. Second ends of cylinders 302 and 304 are hinged or otherwise rotatably coupled to frame assembly 20. Cylinders 302, 304 are operably connected via hydraulic lines to hydraulic coupling bank 32 and may be controlled in the same manner as other elements of the hydraulic system, by commands from a user positioned in the vehicle cab or adjacent the frame assembly. Rotatable coupling of cylinders 302, 304 to frame assembly 20 and to wheel guides 104a, 104b enables an end of the conveyor to be elevated upon actuation of the cylinders, using frame-mounted controls 33 or cab-mounted hydraulic controls as previously described.

In a particular embodiment (not shown), wheel guides 104a and 104b and cylinders 302 and 304 are mounted on frame assembly 20 such that, when the cylinders are fully retracted, the conveyor rests at an angle with respect to a horizontal plane. This provides an end of the conveyor with an additional degree of built-in elevation independent of any conveyor-mounted or frame-mounted hydraulic elements.

Referring again to FIG. 1, frame assembly 20 also includes a carriage assembly 108 movably mounted thereon to enable side-to-side movement (in the directions indicated by arrows "A" and "B") of a conveyor 22 positioned and secured on the carriage assembly. Carriage assembly 108 includes a first wheel bracket 108a, a second wheel bracket 108b positioned and secured opposite first bracket 108a, wheels 106 rotatably mounted on each of brackets 108a, 108b, and one or more conveyor supports 109 connecting wheel brackets 108a and 108b.

Each of wheel brackets 108a, 108b is formed from a length of steel angle stock, channel stock, or from a steel member having an otherwise suitable cross-sectional shape. The compositions and structures of the wheel brackets 108a, 108b are specified to provide the strength and rigidity necessary to perform their functions as desired under the static and dynamic loads imposed thereon during movement and operation of the conveyor and conveyor transport system. In the embodiment shown in FIG. 1, wheel bracket 108a provides a biasing surface against which conveyor 22 is urged prior to positioning and securement of adjustable clamps (as described in more detail below) to conveyor supports 109.

Referring to FIGS. 1 and 1B, each of wheel brackets 108a, 108b has a plurality of rollers or wheels 106 mounted therealong. The compositions and structures of wheels 106 and the wheel mountings are specified so as to ensure that the wheels will roll freely along wheel guides 104a, 104b mounted on corresponding sides of frame assembly 20. In addition, the wheels and mountings must be capable of supporting the static and dynamic loads imposed thereon during movement and operation of the carriage assembly and conveyor. Any of a variety of commercially available steel wheels and roller bearings may be used for the wheels and wheel mountings.

Referring again to FIG. 1, opposite end portions of an end wall 310 are secured to wheel brackets 108a, 108b proximate an end of carriage assembly 108, by welding or other suitable means. End wall 310 serves as a conveyor positioning aid, providing a biasing surface against which an end of conveyor 22 is positioned when the conveyor is placed upon the carriage assembly. A substantial portion of the weight of the conveyor and any bulk material residing thereon may rest on end wall 310 when carriage assembly 108 is inclined by cylinders 302, 304. Thus, any method used to secure the end wall to wheel brackets 108a, 108b should ensure that the static and dynamic loads acting on the end wall and wheel brackets will be supported.

Figure 7:
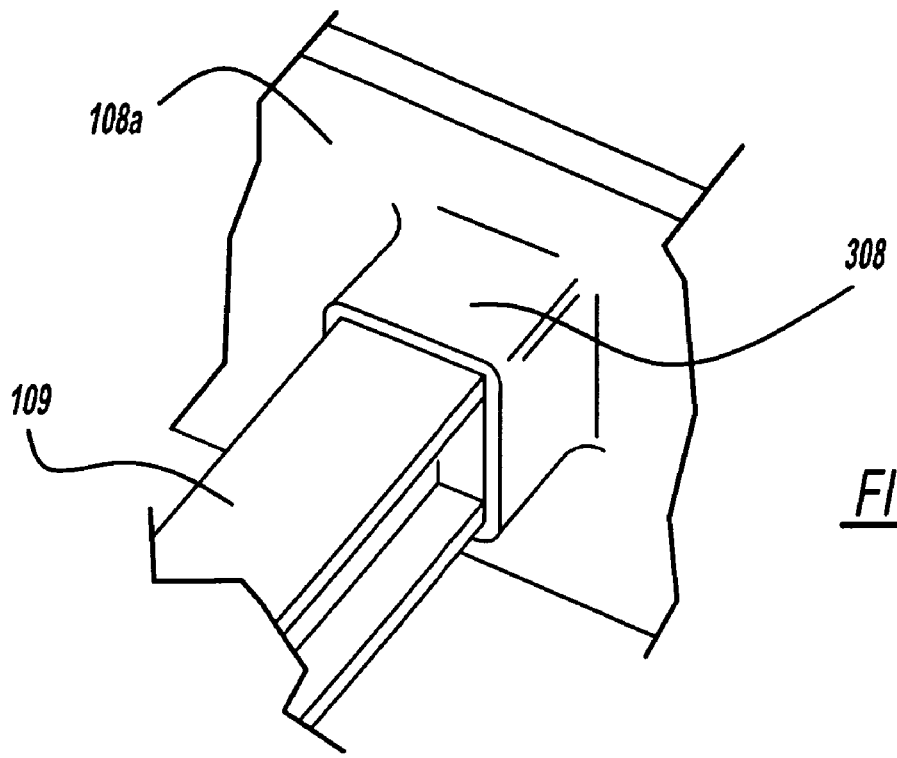

Referring now to FIG. 7, conveyor support mounting sleeves 308 are welded or otherwise suitably attached to wheel brackets 108a, 108b to permit mounting of conveyor supports 109 therein, as described below. Sleeves 308 can be provided for the mounting of any desired number of conveyor supports, according to the needs of a particular application. Alternatively, conveyor supports 109 may be attached directly to wheel brackets 108a, 108b by welding or secured to the brackets using other suitable means. If so desired, the structure(s) and number of conveyor supports coupled to the wheel brackets can be varied according to the need of a particular application. For example, enabling the mounting of a relatively greater number of conveyor supports on the carriage assembly has the benefit of distributing the weight of the conveyor among a greater number of conveyor supports, thereby more evenly distributing the weight of the conveyor on the carriage assembly.

Referring again to FIG. 1, conveyor supports 109 combine to form a bed in which the conveyor 22 is received and secured. In addition, the effective width of the bed may be increased or reduced in a manner described below, to accommodate a conveyor having any of a variety of different widths. In the embodiment shown in FIG. 1, conveyor supports 109 are in the form of cross-bars connecting wheel brackets 108a and 108b. Conveyor supports 109 also operatively couple together wheel brackets 108a and 108b so that the wheel brackets travel in unison along wheel guides 104a, 104b under the influence of a carriage drive system 114 (described in greater detail below) connected to one of the conveyor supports 109c which serves as a drive member (also described below). Conveyor supports 109 also provide additional rigidity and stability to the carriage assembly. Conveyor supports 109 may be formed from I-beams, channel sections, angle brackets, or any other steel structural members having suitable cross-sectional shapes.

In the embodiment shown in FIGS. 1 and 9, end portions of conveyor supports 109 are configured for insertion into mounting sleeves 308 formed in wheel brackets 108a, 108b, thereby securing the conveyor supports to the wheel bracket. Other methods of securing the conveyor supports to the wheel brackets are also contemplated. For example, as stated previously, conveyor supports 109 may be welded or otherwise secured directly to wheel brackets 108a, 108b.

Referring to FIGS. 1 and 5A-8, any of a variety of adjustable clamps 306, 312, 314 may be mounted along wheel bracket 108a and to conveyor supports 109 to enable conveyor 22 to be biased and secured against a side of the carriage assembly closest to the loader. Clamps 306, 312, 314 may be, for example, heavy-duty, hold down toggle clamps, "C"-clamps, bar clamps, and/or any other types of clamps which may be adapted to secure conveyor 22 to wheel bracket 108a after positioning of the conveyor on the carriage assembly. The designs and configurations of the clamps shown are merely examples of suitable clamps. Other clamp designs suitable for the purposes described herein may also be used.

Figure 8:
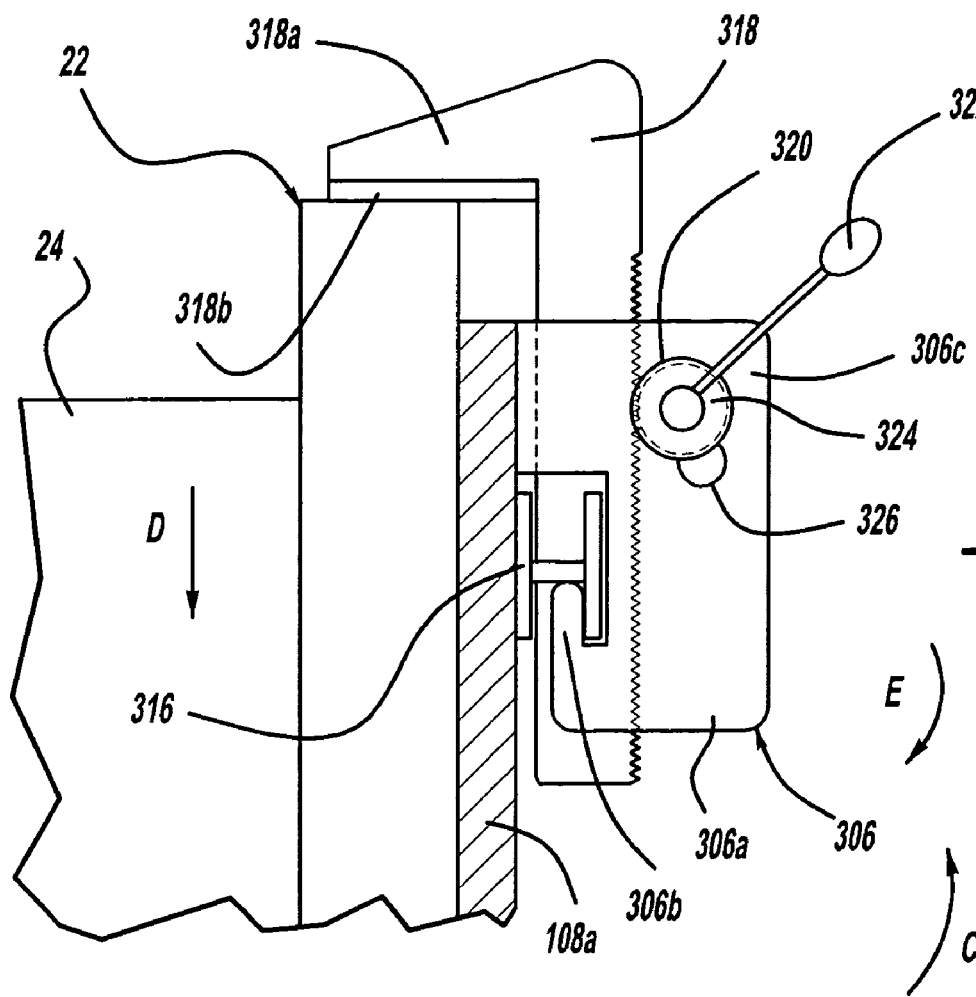

In the embodiment shown in FIG. 8, clamps 306 for mounting on wheel bracket 108a include a base portion 306a having a pair of opposed lipped flanges 306b extending therefrom for engaging an I-beam 316 secured to the side of wheel bracket 108a. Base portion 306a has a channel extending therethrough for mounting a rack gear 318 therein. Rack gear 318 has a lip 318a extending from an end thereof, and a resilient pad 318b attached to an underside of lip 318a for engaging a portion of conveyor 22, as described in greater detail below. A pinion gear 320 is rotatably mounted between opposed adjacent ears 306c extending from base portion 306a, for complementary engagement with rack gear 318. A lever 322 is coupled to pinion gear 320 to enable turning of the gear by a user. A toothed wheel 324 is also coupled to pinion gear 320 along an exterior of an ear 306b so as to rotate in conjunction with the pinion gear. A spring-loaded pawl 326 is rotatably mounted to an exterior of base portion ear 306b and is positioned so as to enable engagement with toothed wheel 324 to prevent counter-rotation of the toothed wheel (and, correspondingly, counter-rotation of pinion gear 320) when the rack gear is engaged with the conveyor.

To move rack gear 318A into engagement with conveyor 22, lever 322 is rotated in the direction indicated by arrow "C" to rotate pinion gear 320. This rotation of the pinion gear produces a corresponding translation of rack gear in the direction indicated by arrow "D". As toothed wheel 324 turns, the wheel teeth engage pawl 326 to prevent counter-rotation of the wheel. The lever is turned until lip 318a and its associated resilient pad 318b engage a portion of conveyor 22 positioned adjacent wheel bracket 108a. Continued rotation of lever 322 compresses pad 318a against conveyor 22, thereby increasing the clamping force acting on conveyor 22 until the conveyor is securely clamped to wheel bracket 108a. When lip 318a is engaged with conveyor 22, lipped flanges 306b engage I-beam 316 to aid in securing the clamp base portion to wheel bracket 108a. When it is desired to release the conveyor, pawl 326 is rotated to disengage from toothed wheel 324, thereby permitting counter-rotation of lever 322 in the direction indicated by arrow "E" to raise rack gear 318.

The above is a description of just one example of how a portion of the conveyor may be secured to the carriage assembly. Other methods of securing the conveyor to the carriage are also contemplated.

Figure 5A:
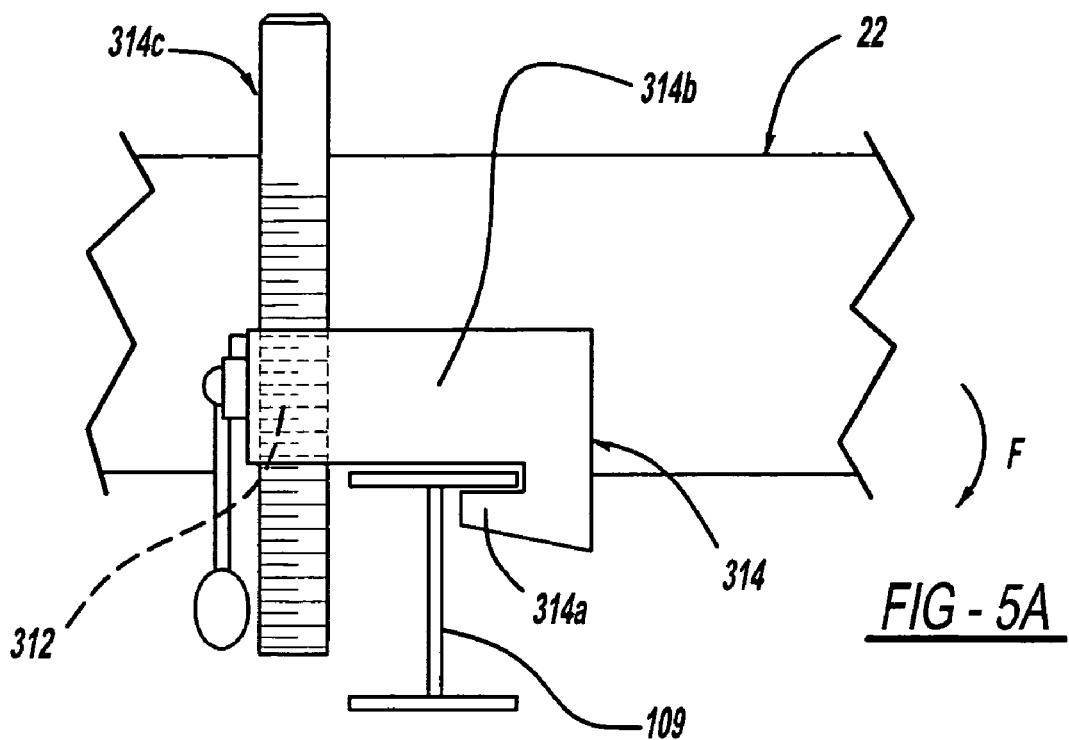
Figure 6:
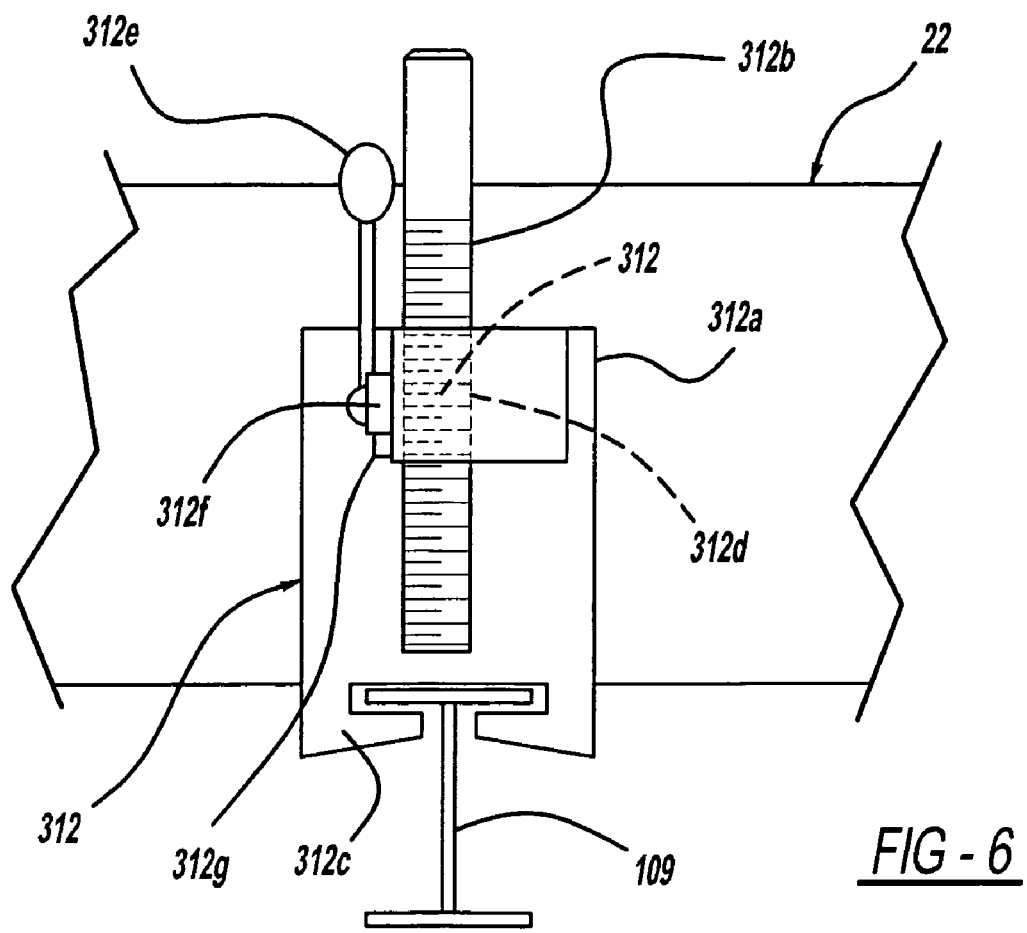

Referring again to FIGS. 1, 5A, 6, and 7, adjustable clamps 312, 314 may also be applied to conveyor supports 109 to aid in securing conveyor 22 to carriage assembly 108. In one embodiment (shown in FIGS. 1 and 6), conveyor support clamps 312 are permanently slidingly mounted to the conveyor supports. Referring to FIG. 6, clamps 312 include a base portion 312a and a channel extending therethrough for mounting a rack gear 312b therein as previously described with regard to clamp 306 (FIG. 8). Base portion 312a includes an interface designed to slidingly engage conveyor support 109 so that the clamp can be moved anywhere along the length of the conveyor support as needed. This enables the clamp to be positioned to engage and secure any of a variety of conveyors having different widths. In the embodiment shown in FIG. 6, conveyor support 109 is formed from an I-beam section, and clamp 312 includes a pair of lipped projections 312c extending from base portion 312a to slidingly engage a flange of the I-beam. The clamp base portion 312a may be applied to the I-beam prior to securement of the I-beam end portions to wheel brackets 108a, 108b.

It will be appreciated that structural members having alternative cross-sectional shapes may be used for conveyor supports 109, and that the structure of the clamp base portion would be configured to slidingly engage whatever cross-sectional shape is employed.

The clamping mechanism and operation of conveyor support clamp 312 is substantially the same as that of wheel bracket clamp 306 previously described and includes rack gear 312b, a pinion gear 312d operatively engaged with the rack gear, a lever 312e for rotating the pinion gear, a toothed wheel 312f coupled to the pinion gear, and a spring-loaded pawl 312g for engaging the toothed wheel to prevent counter-rotation of the wheel and pinion gear. When conveyor 22 is positioned on conveyor supports 109 and biased against wheel bracket 108a and end wall 310, conveyor support clamps 312 are moved along the conveyor supports until rack gears 312b are in position to engage the conveyor. Clamps 312 may then be applied and released in the manner described for wheel bracket clamp 306. Clamps 312 may be slidably mounted on conveyor supports 109 in the manner shown in FIG. 6, or other known methods may be used to slidably mount the clamps to the conveyor supports.

The dimensions of the clamp constituents and wheel brackets 108a, 108b are specified so as to enable conveyors having a predetermined range of height dimensions H (see FIG. 10) to be secured on carriage assembly 108.

In another embodiment, conveyor support clamps are not permanently mounted to the conveyor supports, but are positioned on and secured to the conveyor supports after the conveyor is placed on the carriage assembly. Referring to FIG. 5A, in this embodiment clamp 314 has a single lipped projection 314a extending from an underside of a base portion 314b and a rack gear channel and pinion gear offset to a side of the conveyor support. Rack gear 314c is dimensioned so that a bottom portion of the gear projects from a bottom of the channel and resides adjacent the conveyor support when the clamp is engaged with the conveyor. This sandwiches the conveyor support between rack gear 314c and lipped extension 314a, to constrain sideways motion of the clamp when mounted.

To position the clamp on the conveyor support, the bottom end of rack gear 314c is retracted into base portion 314b or completely removed from the base portion, permitting the lipped projection to be seated as shown along a flange of the I-beam. Rack gear 314c is then lowered within base portion 314b to reside opposite projection 314a and to engage the conveyor. Clamp 314 may then be applied and released in the manner described for wheel bracket clamp 306. In addition, the reaction force exerted on rack gear 314c by conveyor 22 when the clamp secured the conveyor to the carriage assembly will tend to cock or turn the clamp base portion in the direction indicated by arrow "F. The resulting contact between lipped projection 314a and conveyor support 109 aids in maintaining clamp 314 in position on the conveyor support.

Alternatively, any of a variety of other types of clamps (including toggle clamps, "C"-clamps, bar clamps, and/or other types of clamps) that are adaptable to engage and secure a side of the conveyor to the carriage assembly may be used, based on the force requirements, conveyor structure, and other characteristics of a particular application. Other mechanisms for clamping the conveyor to the conveyor supports are also contemplated. The adjustable positionability of the clamps described above enables the effective width of the conveyor bed to be varied to accommodate different widths of conveyors. One possible source for clamps usable in the embodiments of the present invention is Wolverine Tool Co. of St. Clair Shores, Mich.

Figure 4:
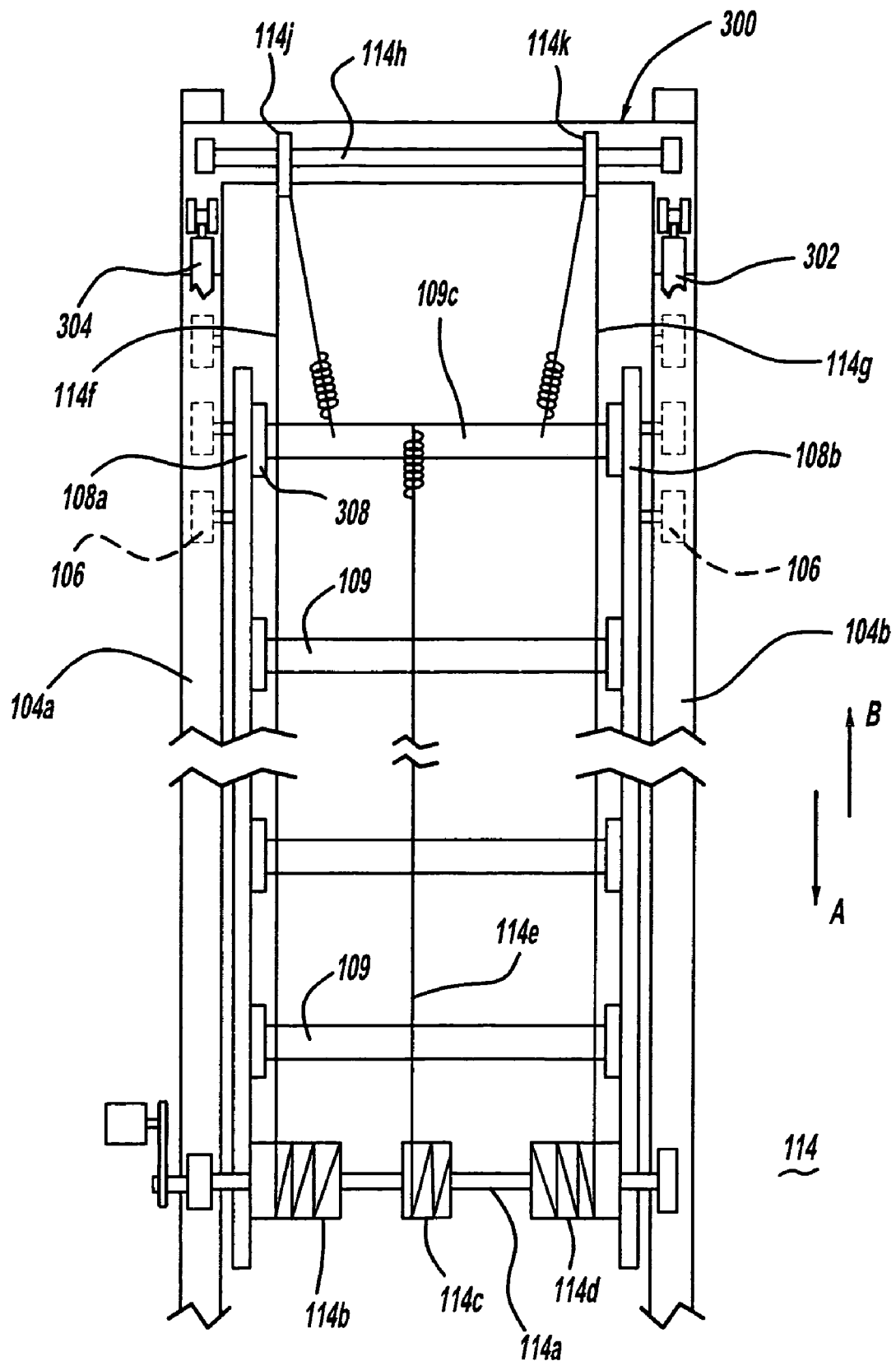
FIG. 4 is a schematic view of an underside of a portion of a frame assembly in accordance with the embodiment of FIG. 1, showing a drive system for moving a conveyor mounted on a mobile frame in accordance with the embodiment of the invention.

Referring now to FIG. 4, a drive member 109c is connected to each of wheel brackets 108a and 108b to move the carriage assembly and the conveyor attached thereto responsive a command from a user. In the embodiment shown in FIG. 4, drive member 109c is welded or otherwise suitably secured at opposite ends thereof to each of wheel brackets 108a and 108b. Drive member 109c is connected to a drive system 114 as described below to enable carriage assembly 108 to be moved in the directions indicated by arrows "A" and "B" (see FIG. 1).

Referring to FIG. 4, a drive system 114 is incorporated into the frame assembly for controlling motion of carriage 108 and conveyor 112. Referring to FIG. 4, a drive shaft 114a and an idler shaft 114h are rotatably mounted to frame assembly 20 for actuating a cable system (described in greater detail below) which controls movement of carriage 108 and conveyor 112 along wheel guides 104a, 104b in the directions indicated by arrows "A" and "B". Drive shaft 114a may be rotatably mounted at each end to one of wheel brackets 104a, 104b, or the drive shaft may be mounted to one of the frame portions. Idler shaft 114h is mounted to conveyor support 300. As seen in FIG. 4, a plurality of cable reels 114b-d is mounted along shaft 114a for taking up and playing out associated lengths of cable as required. Cable 114e is attached to drive member 109c and to reel 114c so as to exert a tension force on carriage 108 (via drive member 109c) in the direction indicated by arrow "A". Similarly, cables 114f and 114g are attached to reels 114b and 114d, respectively, so as to exert tension forces on carriage 108 in the opposite direction (as indicated by arrow "B"). To enable cables 114f and 114g to pull on carriage 108 in the direction of arrow "B", each of cables 114f and 114g is attached to drive member 109c and then passed over a respective idler pulley 114j, 114k mounted on a shaft 114h. The cable ends are then attached to respective reels 114b and 114d. Cable 114e is wound around reel 114c in a first winding direction, and reel 114c plays out and takes up the cable from a first side of the reel. Cables 114f and 114g are wound around the respective reels 114b and 114d in a second winding direction opposite the first winding direction, and these reels play out and take up their respective cables from second sides of the reels opposite the first sides of the reels. This arrangement enables the carriage to be pulled in opposite directions as needed simply by rotating shaft 114a in the appropriate direction. Movement of drive member 109c attached to wheel brackets 108a and 108b produces a corresponding side-to-side motion of conveyor 22 mounted on carriage assembly 108, along the wheel guides 108a, 108b and in one of directions A and B shown in FIG. 1. Springs or similar elements may be attached to the cables for shock absorption. Also, tensioners (not shown) may be attached to the cables to enable adjustments to cable tension as the cables stretch over time from use. To rotate shaft 114a, the shaft is coupled to a hydraulic or electric motor 118 via a gear train, chain drive, or other suitable means.

It will also be appreciated that types of drive systems different from the cable-and-pulley system described herein may be used to drive carriage assembly 108. For example, suitable alternative drive systems include a belt drive, a system using chains and sprockets, or a system including one or more hydraulic cylinders.

As stated previously, a motor (not shown) is incorporated into frame assembly 20 for powering the carriage drive system and any other equipment mounted in the frame assembly. In one embodiment, the motor is a hydraulic motor which is coupled to the carriage drive system, to one or more valves (not shown), and to a bank of controls mounted either on the frame assembly 20 or located in the cab of the front loader. In another embodiment, the motor is an electric motor which receives power from the front loader. Alternatively, the electric motor may be powered by another vehicle or by other means, for example, a stand-alone generator coupled to the motor. The generator may be loaded into an equipment bay formed in the frame assembly, if desired.

Figure 3:
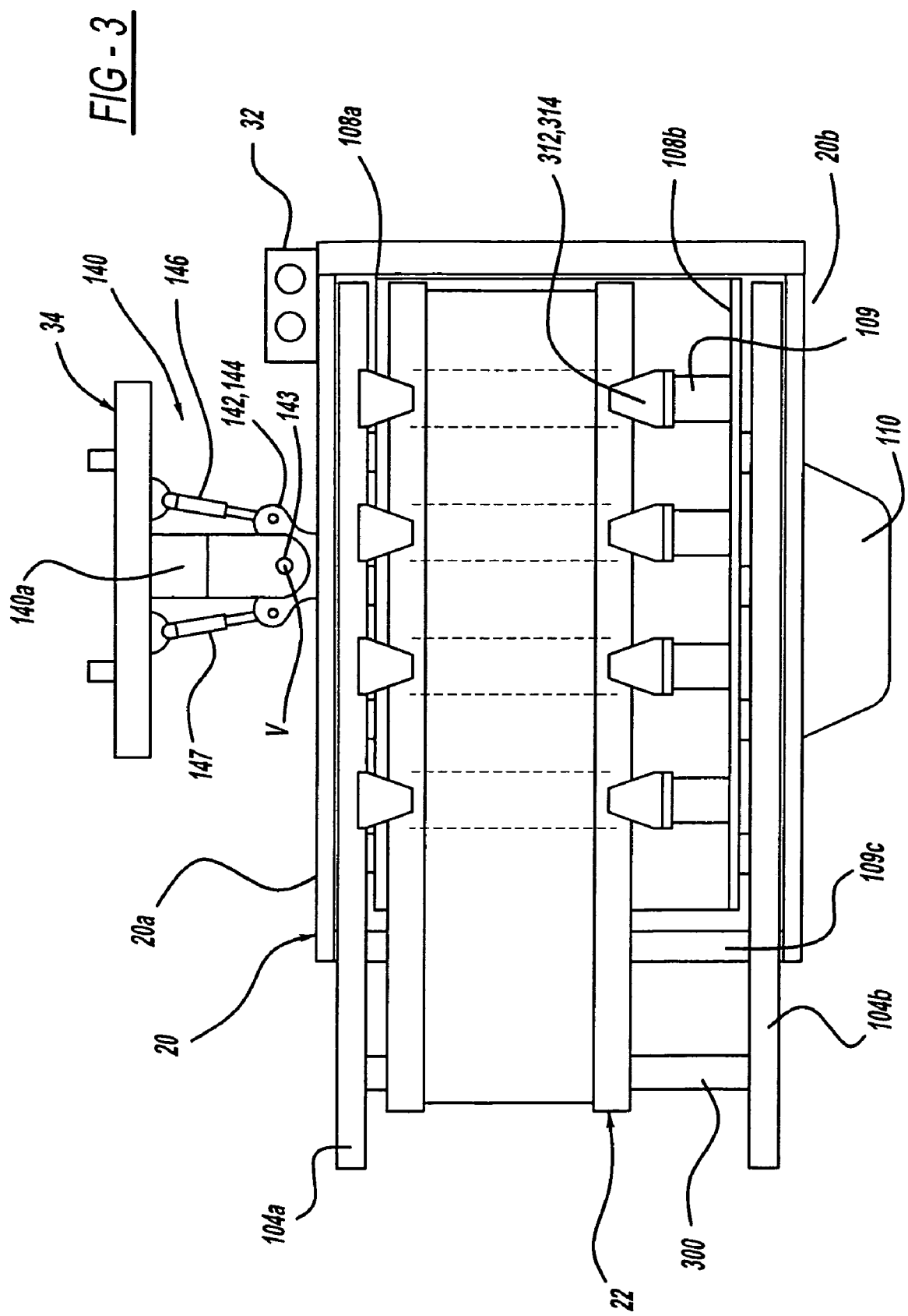
FIG. 3 is a plan view of a portion of an embodiment of the invention showing the swivel system appearing in FIG. 2.

Referring now to FIGS. 2 and 3, in a particular embodiment, adapter 34 has mounted thereto a swivel system, generally designated 140, enabling pivoting of frame assembly 20 about a vertical axis V with respect to front loader 16. The frame assembly 20 is constructed so that adapter 34 may be attached to either side 20a or side 20b of the frame assembly. Bumper 110 is then affixed to the opposite side of the frame assembly. This facilitates rapid attachment of the frame assembly to the loader and provides user flexibility.

Swivel system 140 includes a first clevis 140a and a second clevis 140b secured to adapter 34. First and second devises 140a and 140b may be secured to adapter 34 by welding or other suitable methods. First clevis has a first prong 140c and a second prong 140d. Similarly, second clevis has a first prong 140e and a second prong 140f.

A first swivel plate 142 is mounted on a first pin or shaft 143 so as to swivel or pivot about axis V between first clevis first prong 140c and second prong 140d. A second swivel plate 144 is mounted on a second pin or shaft (not shown) so as to swivel or pivot between second clevis first prong 140e and second prong 140f. The pins or shafts on which swivel plates 142 and 144 are mounted are aligned so as to be substantially coaxial. Swivel plates 142 and 144 are pivotably mounted between prongs of their respective devises using suitable bushings or bearings.

As seen in FIGS. 2 and 3, hydraulic cylinders 146 and 147 are attached to adapter 34 and to frame swivel plate 142. The cylinders may be powered by one or more hydraulic lines connected to the front loader. Actuation of the cylinders may be controlled by a set of hydraulic controls positioned either on the frame assembly or in the front loader cab. When operated in conjunction with each other, cylinders 146 and 147 permit the entire frame assembly to be pivoted about a vertical axis V extending through the swivel plate mounting pins. Cylinders 146 and 147 are actuated in an know manner so as to produce an extension in one of the cylinders and a corresponding contraction of the other cylinder, thereby rotating swivel plates 142, 144 and the connected frame assembly 20 about axis V in a desired manner. This, in conjunction with wheels 26 mounted on the forward-most portion of the frame assembly (as previously described) provide greatly enhanced flexibility in positioning and orienting the frame assembly and conveyor.

Figure 9A:
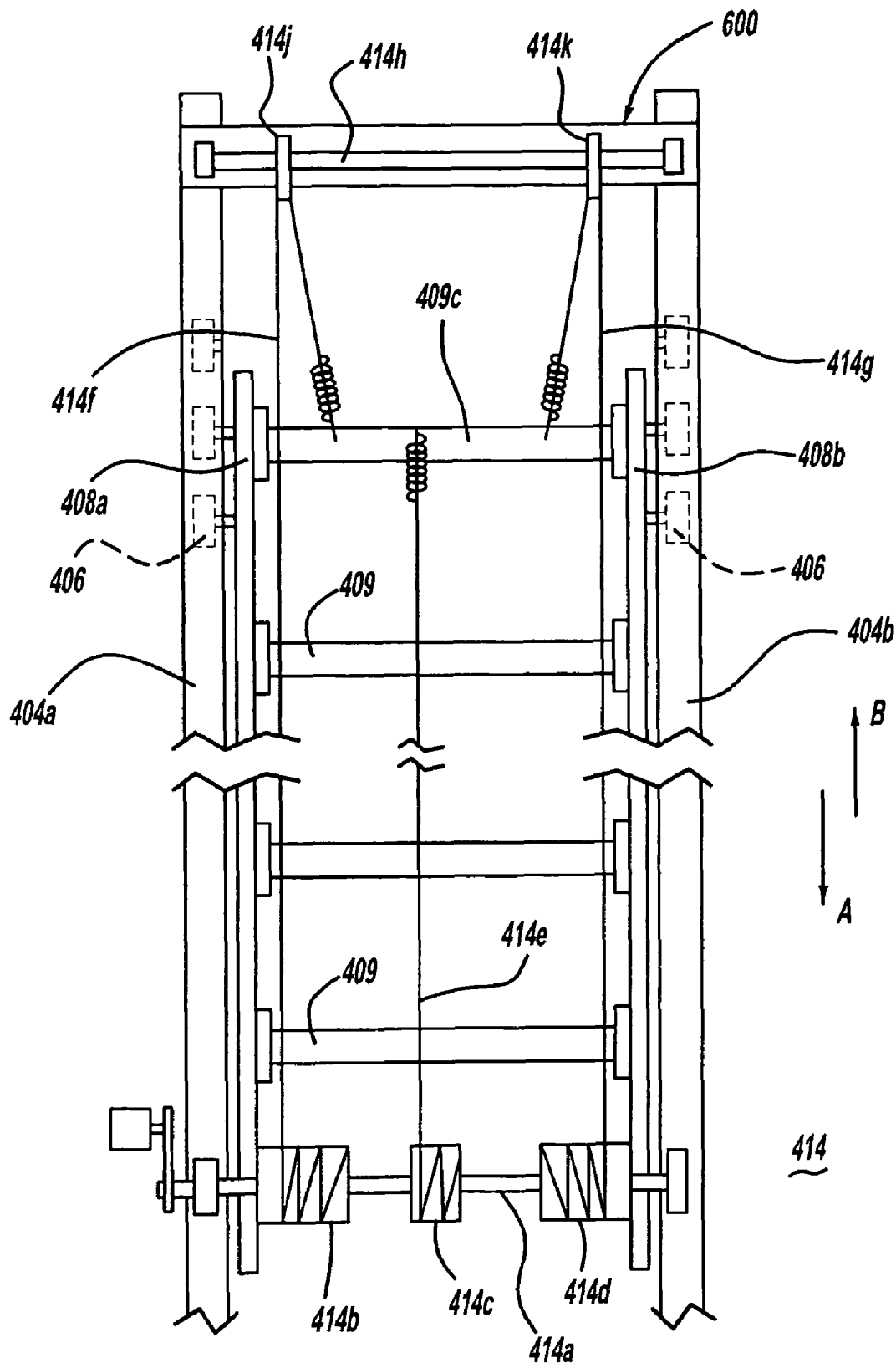
FIG. 9A is a schematic view of an underside of a portion of a frame assembly in accordance with the embodiment of FIG. 9, showing a drive system for moving a conveyor mounted on a mobile frame in accordance with the embodiment of the invention.

FIGS. 9, 9A, and 9B show another embodiment 420 of the mobile frame assembly. In the embodiment shown in FIG. 9, elements similar to those shown in the embodiment of FIGS. 1, 1B, and 4-8 have been given similar reference numerals. Unless otherwise noted, the elements of the embodiment shown in FIGS. 9, 9A, and 9B are constructed and operate in the same manner as similar elements of the embodiment shown in FIG. 1 and previously described.

Referring to FIG. 9, a mobile frame assembly 420 is coupled to the front loader or other transport vehicle using adapter 34. As previously described, frame assembly 420 is configured for mounting conveyor 22 thereon, thus enabling the conveyor to be transported to and used at any worksite accessible by the transport vehicle. As previously described, a motor (not shown), a drive system, and a hydraulic system mounted in the frame assembly enable the position and/or orientation of the conveyor to be adjusted, to facilitate use of the conveyor for transport of bulk-materials from one location to another. However, the embodiments of frame assembly 420 described herein are designed to permit mounting and securement thereon of a portable conveyor having a single predetermined width.

Referring to FIG. 9, the frame assembly 420 comprises a skeleton 400 formed from steel members (for example, channels, I-beams, or tubing) as previously described, for mounting of a carriage assembly 408 thereon. Interior bracing or cross-members, generally designated 402, may be provided as previously described to interconnect the steel members forming skeleton 400, providing additional load bearing capability and rigidity. Frame assembly 420 may include one or more wheels 426 mounted thereon as previously described, to enable the frame assembly to be rolled ahead of the front loader after attachment thereto. A "truck pusher" or bumper 410 as previously described may also be attached to frame assembly 420. A centralized bank of hydraulic couplings 432 as previously described may also be mounted on frame assembly 420 to facilitate coupling between the hydraulic lines and any hydraulic components mounted on the frame assembly.

Referring again to FIG. 9, wheel guides 404a and 404b as previously described are statically mounted to respective sides 420a and 420b of the frame assembly. Alternatively, in another embodiment (not shown), wheel guides 404a and 404b are rotatably connected to respective sides 420a and 420b of frame assembly 420 as previously described, using a hinge arrangement or other means designed to enable rotation of the wheel guides with respect to the frame assembly. Hydraulic cylinders (not shown) are hinged or otherwise rotatably coupled at first ends thereof to corresponding wheel guides 404a, 404b as previously described. Second ends of the cylinders are hinged or otherwise rotatably coupled as previously described to frame assembly 420. Rotatable coupling of the cylinders to frame assembly 420 and to wheel guides 404a, 404b enables an end of the conveyor to be elevated upon actuation of the cylinders, using frame-mounted controls or cab-mounted hydraulic controls.

Referring to FIG. 9B, in a particular embodiment (not shown), wheel guides 404a and 404b are mounted on frame assembly 420 at an angle Ø with respect to a horizontal plane using, for example, struts 499 coupled to both skeleton 400 and wheel guides 404a and 404b, to provide an end of the conveyor with an additional degree of built-in elevation independent of any conveyor-mounted or frame-mounted hydraulic elements.

Referring again to FIG. 9, frame assembly 420 also includes a carriage assembly 408 structured and movably mounted thereon as previously described to enable side-to-side movement (in the directions indicated by arrows "A" and "B") of the conveyor 22. Carriage assembly 408 includes opposed wheel brackets 408a and 408b (not shown in FIG. 9), wheels 406 rotatably mounted on each of brackets 408a, 408b, and one or more conveyor supports 409 (not shown) connecting the wheel brackets. All of these components may be structured and mounted as previously described.

In the embodiment shown in FIG. 9, one or more connecting ears 498 are bolted, welded, or otherwise suitably secured to side portions of the conveyor 22 for attachment (using bolts or other suitable means) to wheel brackets 408a and 408b after positioning of the conveyor on the carriage assembly.

Referring to FIG. 9A, carriage assembly 408 is coupled to a drive system 414 similar to that shown in FIG. 4 for controlling motion of carriage 408 and conveyor 22. A drive member 409c is connected to each of wheel brackets 408a and 408b as in the previously described embodiment to move the carriage assembly and the conveyor attached thereto responsive a command from a user. Drive member 409c is welded or otherwise suitably secured at opposite ends thereof to each of wheel brackets 408a and 408b.

Drive system 414 operates as previously described for the embodiment shown in FIG. 4. A motor (not shown) as previously described may be incorporated into frame assembly 420 for powering the carriage drive system and any other equipment mounted in the frame assembly. Also, in a particular embodiment, adapter 34 has mounted thereto swivel system 140 as previously described to enable pivoting of frame assembly 420 about a vertical axis V with respect to front loader 16.

Figure 10:
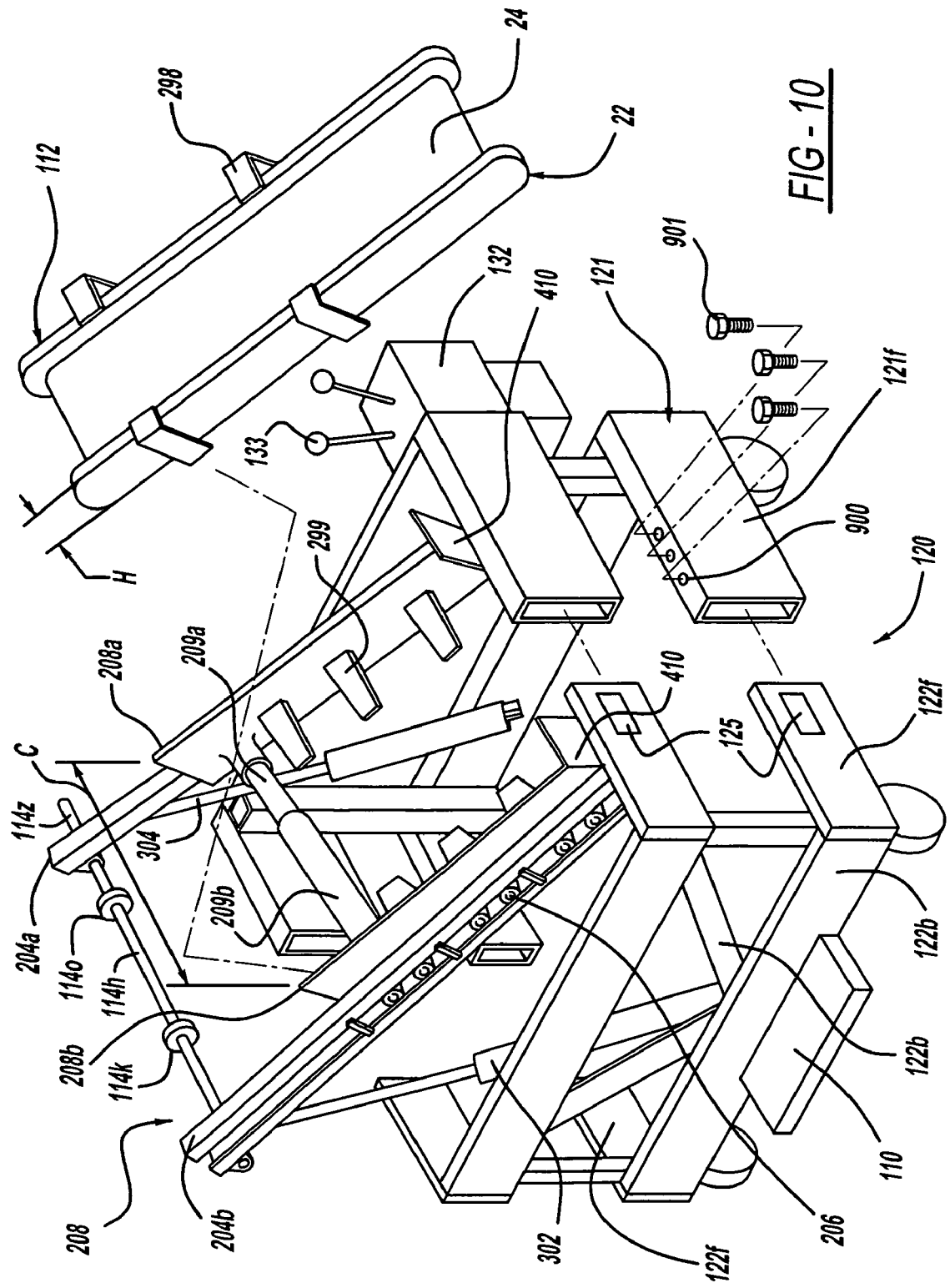
FIG. 10 is an exploded perspective view of a mobile conveyor system in accordance with a third embodiment of the invention.
Figure 11:
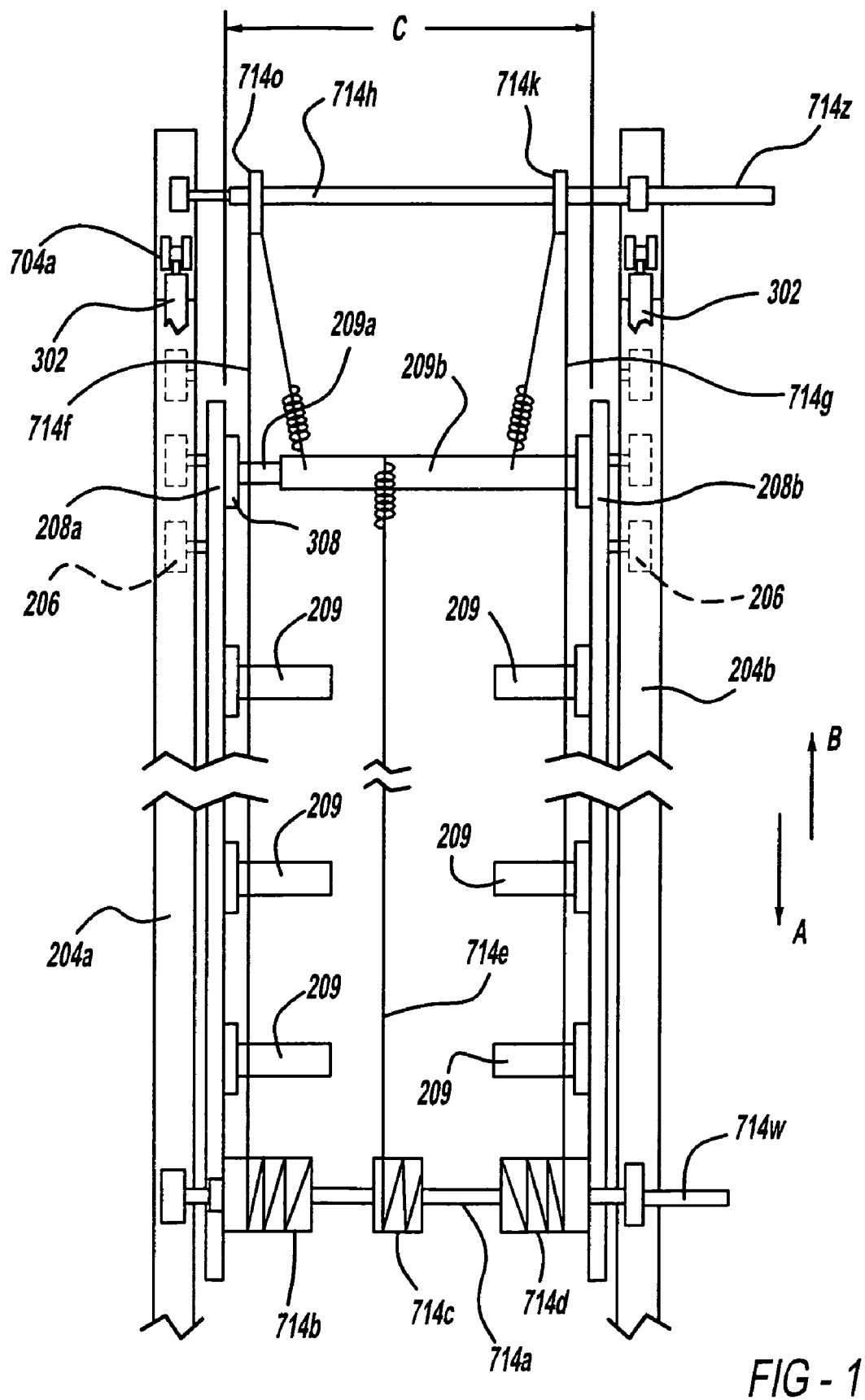
FIG. 11 is a schematic view of an underside of a portion of a frame assembly in accordance with the embodiment of FIG. 10, showing a drive system for moving a conveyor mounted on a mobile frame in accordance with the embodiment of the invention.

Referring now to FIGS. 10 and 11, in another embodiment, frame assembly 120 includes a first frame portion 121 and a second frame portion 122 adjustably coupled to the first frame portion to permit expansion or contraction of a width dimension "C" (shown in FIG. 11) between wheel brackets of an associated carriage assembly 208 to accommodate different widths of conveyor 112. Unless otherwise noted, the elements of the embodiment shown in FIG. 10 are constructed and operate in the same manner as similar elements of the embodiment shown in FIG. 1 and previously described.

First frame portion 121 includes a skeleton 121a formed from steel members (such as channels or tubing) welded or otherwise suitably connected as described for the previous embodiment to provide a rigid structure for supporting the weight of one or more hydraulic motors, a portion of carriage assembly 208, hydraulic fluid lines and controls, and a portion of conveyor 112 thereon.

Interior bracing or cross-members (not shown) as previously described interconnect the steel members forming skeleton 121a to provide additional load bearing capability and rigidity. Cross-members may also define one or more equipment beds or cages for receiving the hydraulic motor and other frame-mounted elements therein. Cross-members 121b may also provide structural members for securing hydraulic fluid lines thereto as needed. Cross-members 121b may be formed from steel tubing, angle sections, channel sections, cabling, or other suitable structural elements or materials. As in the previously described embodiment of the frame assembly, cross-members 121b may be connected to each other and to skeleton 121a by welding, fasteners, or other suitable methods.

Frame assembly 120 may also be designed to minimize the weight of the cross members and other equipment incorporated into the first frame portion 121, thereby correspondingly minimizing the weight of the first frame portion. To this end, the first frame portion may also be constructed such that any equipment beds or cages, cross-members, and any associated equipment are positioned as close as possible to adapter 34 when the frame assembly is mounted to the front loader. This reduces the force moments acting both on the loader and on the mounting connections between the loader and first frame portion 121.

Referring again to FIG. 10, second frame portion 122 also includes a skeleton 122b formed from steel members (such as channels or tubing) welded or otherwise suitably connected to provide a rigid structure for supporting a portion of conveyor 112 thereon. If desired, second frame portion 122 may be used to receive therein and support the weight of one or more hydraulic motors, a portion of carriage assembly 208, hydraulic fluid lines and controls, and/or other components.

Interior bracing or cross-members, generally designated 122b, interconnect the steel members forming second frame portion skeleton 122a to provide additional load bearing capability and rigidity. Cross-members 122b also define one or more equipment beds or cages for receiving the hydraulic motor and other frame-mounted elements therein. Cross-members 122b also provide structural members for securing fluid lines thereto as needed. Cross-members 122b may be formed from steel tubing, angle sections, channel sections, cabling, or other suitable structural elements or materials. Cross-members 122b may be connected to each other and to skeleton 122a by welding, fasteners, or other suitable methods.

As with first frame portion 121, the design of second frame portion 122 and the amount of equipment incorporated into the second frame portion may be minimized in order to correspondingly minimize the weight of the second frame portion. This reduces the moments acting on the loader and the mounting connections between the loader and first frame portion 121.

Adjustable coupling between first and second frame portions 121 and 122 may be provided using any of a variety of known methods. Generally, adjustable coupling of the frame portions is achieved by constructing elements of the frame portions from structural members designed to slide within each other, along each other, or otherwise with respect to each other to achieve the desired dimension "C" for accommodating a conveyor of a particular width.

In the particular embodiment shown in FIG. 10, the adjustable coupling of first and second frame portions 121 and 122 is achieved by constructing elements of the frame portions from tubular members designed to "telescope" with respect to each other, with elements 122f of second frame portion 122 sliding into and out of respective corresponding elements 121f of first frame portion 121. Linear guide bushings, bearings, and/or friction reducing materials may be provided on the first and second frame portions to facilitate smooth motion of second frame portion with respect to first frame portion, without binding. Suitable linear motion guide mechanisms are manufactured by any of a variety of vendors, for example, Chicago THK America, Inc. of Schaumburg, Ill. The embodiment shown in FIG. 10 incorporates multiple THK flat roller systems 125 mounted on second frame portion 122. Alternatively, elements of the linear motion guide mechanisms may be mounted on second frame portion 121 or on both first and second frame portions 121 and 122, depending on the particular linear motion guide system employed.

The adjustable positionability of the second frame portion with respect to the first frame portion enables the effective width of the conveyor bed (along dimension "C" as shown in FIG. 10) to be varied to accommodate different widths of conveyors.

A frame securement mechanism is provided for securing frame portions 121 and 122 in a desired configuration. In one embodiment, one of frame portions 121 and 122 is provided with a set of spaced apart threaded bolt receiving holes 900 for accommodating securement bolts 901 therein. This allows the bolts to engage and secure together both of frame portions 121 and 122 in a variety of configurations, providing the dimensional adjustability needed to accommodate different widths of conveyors.

When the relative positions of frame portions 121 and 122 have been adjusted so as to provide the spacing desired for receiving conveyor 122 thereon, bolts 901 in holes 900 are tightened until the bolts extend completely through holes 900 to contact and bear against second frame portion elements 122f. This secures the frame portions 121 and 122 in the desired relationship. Any of a variety of alternative securement methods may be employed. Frame assembly 120 may also include wheels 26, a bumper 110, and a hydraulic coupling bank mounted thereon as in the embodiment of the frame assembly previously described.

Referring again to FIG. 10, tracks or wheel guides 204a, 204b are hinged or otherwise rotatably coupled on respective ones of first and second frame portions 121 and 122 as in the previously described embodiment of the frame assembly (shown in FIG. 1). Wheel guides 204a and 204b are secured to the frame portions 121 and 122 so that each wheel guide moves in conjunction with its associated frame portion. If desired, wheel guides 204a and 204b may be mounted at an angle with respect to a horizontal plane as set forth in the description of the previously mentioned embodiment.

As seen in the previously described embodiment, hydraulic cylinders 302 and 304 are coupled at first ends thereof to respective ones of first and second frame portions 121 and 122, and at second ends thereof the respective ones of wheel guides 204a and 204b. Cylinders 302, 304 are operably connected via hydraulic lines to hydraulic coupling bank 132 and may be controlled in the same manner as other elements of the hydraulic system, by commands from a user positioned in the vehicle cab or adjacent the frame assembly. Rotatable coupling of cylinders 302, 304 to frame assembly 120 and to wheel guides 204a, 204b enables an end of the conveyor to be elevated upon actuation of the cylinders, using frame-mounted controls 133 or cab-mounted hydraulic controls as previously described.

Referring again to FIG. 10, carriage assembly 208 is movably mounted on frame assembly 120 to enable side-to-side movement of conveyor 112 positioned and secured within the frame assembly. The construction of carriage assembly 208 is substantially the same as that set forth in the description of the carriage assembly embodiment shown in FIG. 1. Carriage assembly 208 comprises a first wheel bracket 208a, a second wheel bracket 208b, and one or more carriage drive member sections 209a and 209b coupled to respective ones of wheel brackets 208a and 208b.

Wheel brackets 208a and 208b may be constructed as in the previously described embodiment of the frame assembly (shown in FIG. 1). As set forth in the description of the previous embodiment, each of wheel brackets 208a and 208b is formed from a length of steel angle stock, channel stock, or from a steel member having an otherwise suitable cross-sectional shape. The compositions and structures of the wheel brackets are specified to provide the strength and rigidity necessary to perform their desired functions under the static and dynamic loads imposed thereon during movement and operation of the conveyor and conveyor transport system.

Each wheel bracket has a plurality of rollers or wheels 206 mounted therealong. The compositions and structures of wheels 206 and the wheel mountings are specified so as to ensure that the wheels will roll freely along wheel guides 204a, 204b mounted on a corresponding one of frame portions 121 and 122. In addition, the wheels and mountings must be capable of supporting the static and dynamic loads imposed thereon during movement and operation of the conveyor. Any of a variety of commercially available steel wheels and roller bearings may be used for the wheels and wheel mountings.

Each wheel bracket may also have conveyor support sleeves (not shown) mounted thereon to enable attachment of associated conveyor support sections thereto, as previously described.

Referring to FIG. 10, a series of conveyor supports 299 is welded or otherwise suitably attached to each of wheel brackets 208a and 208b, for receiving and holding conveyor 22 thereon. Conveyor supports 299 extend in cantilevered fashion from their attachment points on a respective one of wheel brackets 208a and 208b toward the other one of the wheel brackets to support the weight of conveyor 112, thereby collectively forming a bed which is therefore expandable to receive and support thereon conveyors having any of a range of width dimensions. Conveyor supports are formed from steel or other suitable materials.

FIG. 11 shows a drive system 714 similar to those shown in FIGS. 4 and 9A, for controlling the movement of the carriage assembly embodiment shown in FIG. 10.

A drive member 209 is formed into sections 209a and 209b configured to slide within, along, or otherwise with respect to each other, as previously described with regard to first and second frame portions 121 and 122. Specified ones of drive member sections 209a, 209b are coupled to the carriage assembly drive system as previously described to move the wheel brackets and the conveyor attached thereto along wheel guides 204a and 204b responsive a command from a user. Ends of a telescoping idler shaft 714h are rotatably mounted to first ends of respective ones of wheel guides 204a and 204b. Ends of a telescoping drive shaft 714a are rotatably mounted either to second ends of respective ones of wheel guides 204a and 204b, or to respective ones of frame portions 121 and 122. These telescoping drive and idler shaft accommodate sliding motion of frame portions 121 and 122 relative to each other to achieve the desired dimension "C" for accommodating a conveyor of a particular width. Other methods are also contemplated for rotatably mounting the drive and idler shafts to the frame assembly so as to permit relative motion of frame portions 121 and 122. For example, in alternative embodiment (not shown), idler rollers 714o and 714k are mounted to wheel guides 204a and 204b, respectively, using cantilevered mounting flanges secured to the wheel guides.

In an alternative embodiment (not shown), conveyor supports 299 are formed by sections designed to telescope or otherwise matingly slide along, within, or in relation to each other, in a manner similar to drive member 209 shown in FIG. 10. Each of these conveyor support sections is welded or otherwise suitably secured to a respective one of wheel brackets 208a and 208b. The conveyor support sections, when mated, support a portion of the weight of conveyor 112 and combine to form a bed in which the conveyor 112 is received and secured. The conveyor support sections also operatively couple together wheel brackets 208a and 208b so that the wheel brackets travel in unison along wheel guides 204 under the influence of the carriage drive system 114 (described in greater detail below) connected to drive member 209c. These conveyor supports also provide additional rigidity and stability to the carriage assembly. Also, one of these telescoping conveyor supports may be used as a drive member for coupling to the carriage drive system, as previously described. In this embodiment, the telescoping structures of the conveyor supports enable the spans of the conveyor supports to be increased or decreased responsive to sliding of frame second portion 122 with respect to frame first portion 121. This, in turn, enables conveyors of different widths to be supported and secured on the conveyor supports. If desired one or more securement mechanisms may be provided to secure the conveyor support sections with respect to each other once a predetermined conveyor support span has been achieved. To facilitate binding-free movement of conveyor support sections 299a and 299b with respect to each other during movement of frame portions 121 and 122, linear motion guide elements similar to those provided for frame portions 121 and 122 may be incorporated into the conveyor support sections.

Referring again to FIG. 10, an end wall section 410 is secured to each of wheel brackets 208a, 208b proximate an end of carriage assembly 208, by welding or other suitable means. End wall section 410 serves as a conveyor positioning aid, providing a biasing surface against which an end of conveyor 22 is positioned when the conveyor is placed upon the carriage assembly. A substantial portion of the weight of the conveyor and any bulk material residing thereon may rest on end wall sections 410 when carriage assembly 208 is inclined by cylinders 302, 304. Thus, any method used to secure the end wall to wheel brackets 208a, 208b should ensure that the static and dynamic loads acting on the end wall and wheel brackets will be supported.

Conveyor 22 may be secured to carriage assembly using clamps as previously described positioned along wheel brackets 208a and 208b. Alternatively, as shown in FIG. 10, one or more connecting ears 298 may be bolted, welded, or otherwise suitably secured to side portions of the conveyor for attachment (using bolts or other suitable means) to wheel brackets 208a and 208b after positioning of the conveyor on the carriage assembly. In the embodiment shown in FIG. 10, the overall adjustability of the frame assembly dimension "C" enables the smallest width dimension necessary for mounting of the conveyor to be achieved, thereby minimizing the size of the envelope occupied by the frame for a given conveyor.

It will be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A mobile frame assembly for mounting a conveyor thereon, the frame assembly comprising:
   a skeleton;
   a carriage assembly movably coupled to the skeleton for mounting the conveyor thereon, the carriage assembly being movable in a first direction and a second direction with respect to the skeleton, the second direction being substantially opposite the first direction, the carriage assembly including at least one conveyor support for positioning the conveyor thereon, a plurality of wheels rotatably coupled to the at least one conveyor support, and at least one wheel guide for guiding the plurality of wheels in the first direction and the second direction, thereby enabling movement of the carriage assembly in the first direction and the second direction;
   a drive system for moving the carriage assembly in the first direction and the second direction, the drive system including, a drive member coupled to the carriage assembly, a drive shaft rotatably mounted to the frame assembly, an idler shaft rotatably mounted to the frame assembly, a first cable having a first end attached to the drive shaft and a second end attached to the drive member, such that rotation of the drive shaft in a third direction produces a corresponding motion of the drive member in the first direction, and a second cable having a first end attached to the drive shaft, a second end attached to the drive member, and a portion intermediate the first and second ends wrapped about the idler shaft, such that rotation of the drive shaft in a fourth direction opposite the third direction produces a corresponding motion of the drive member in the second direction.

2. The frame assembly of claim 1 wherein the carriage assembly further comprises a plurality of spaced-apart wheel brackets, wherein first wheels of the plurality of wheels are rotatably mounted to a first wheel bracket of the plurality of wheel brackets, second wheels of the plurality of wheels are rotatably mounted to a second wheel bracket of the plurality of wheel brackets, and wherein the at least one conveyor support is mounted to at least one wheel bracket of the plurality of wheel brackets.

3. The frame assembly of claim 1 further comprising means operatively coupled to the drive system for moving the carriage assembly.

4. The frame assembly of claim 1 further comprising rotating means operatively coupled to the drive shaft for rotating the drive shaft.

5. The frame assembly of claim 4 further comprising means operatively coupled to the rotating means for providing power to the rotating means for rotating the drive shaft.

6. The frame assembly of claim 1 further comprising a third cable having a first end attached to the drive shaft, a second end attached to the chive member, and a portion intermediate the first and second ends wrapped about the idler shaft, such that rotation of the drive shaft in the fourth, direction produces a corresponding motion of the drive member in the second direction.

7. The frame assembly of claim 1 wherein the at least one wheel guide is rotatably coupled to the skeleton and wherein the conveyor system further comprises means coupled to the at least one wheel guide for rotating the at least one wheel guide to produce a corresponding rotation of a conveyor secured to the carriage assembly.

8. The frame assembly of claim 7 wherein the means for rotating the at least one wheel guide comprises a hydraulic cylinder.

9. A mobile conveyor system comprising:
   a mobile frame assembly for mounting a conveyor thereon, the frame assembly defining a conveyor mounting bed having a first end rotatably coupled to the frame assembly, and a second end opposite the first end;
   a vehicle coupled to the frame assembly for transporting the frame assembly and the conveyor, wherein the frame assembly is coupled to the vehicle by a swivel assembly to enable the frame assembly to swivel with respect to the vehicle about a substantially vertical axis, and wherein the swivel assembly includes:
   an adapter configured for securement to a portion of the vehicle;
   a first bracket secured to the adapter;
   a first member secured to the frame assembly and pivotably connected to the first bracket so as to enable pivoting of the first member with respect to the first bracket;
   a first hydraulic cylinder connected to the adapter and the first member so as to initiate pivoting of the first member with respect to the first bracket upon actuation of the first hydraulic cylinder; and
   a second hydraulic cylinder connected to the adapter and the first member so as to initiate, in conjunction with the first hydraulic cylinder, pivoting of the first member with respect to the first bracket upon actuation of the second hydraulic cylinder.

10. The conveyor system of claim 9 wherein the frame assembly is coupled to the vehicle by an adapter having a first portion configured for securement to a portion of the vehicle, and a second portion configured for securement to the frame assembly.

11. The conveyor system of claim 9 wherein the frame assembly is coupled to the vehicle by a swivel assembly to enable the frame assembly to swivel with respect to the vehicle about a substantially vertical axis.

12. The conveyor system of claim 9 wherein the at least one rotatable guide and the conveyor mounting bed do not form part of the conveyor.

13. The conveyor system of claim 9 wherein the swivel assembly further comprises:
   a second bracket secured to the adapter; and
   a second member secured to the frame assembly and pivotably connected to the second bracket so as to enable pivoting of the second member with respect to the second bracket.

* * * * *

UNITED STATES PATENT AND TRADEMARK OFFICE
CERTIFICATE OF CORRECTION

PATENT NO. : 7,891,479 B2  
APPLICATION NO. : 12/218651  
DATED : February 22, 2011  
INVENTOR(S) : Evangelista et al.

Page 1 of 1

It is certified that error appears in the above-identified patent and that said Letters Patent is hereby corrected as shown below:

Column 11, Line 11; Delete "devises" and insert --clevises--.

Column 11, Line 24; Delete "devises" and insert --clevises--.

Column 11, Line 35; Delete "an know" and insert --a known--.

Column 18, Claim 6, Line 9; Delete "chive" and insert --drive--.

Signed and Sealed this  
Tenth Day of May, 2011

David J. Kappos  
*Director of the United States Patent and Trademark Office*